(12) United States Patent
Ito et al.

(10) Patent No.: US 12,399,988 B2
(45) Date of Patent: Aug. 26, 2025

(54) INFORMATION NOTIFICATION METHOD AND INFORMATION NOTIFICATION DEVICE

(71) Applicant: Panasonic Automotive Systems Co., Ltd., Kanagawa (JP)

(72) Inventors: Takayoshi Ito, Osaka (JP); Yuishi Torisaki, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/020,851

(22) Filed: Jan. 14, 2025

(65) Prior Publication Data

US 2025/0156540 A1 May 15, 2025

Related U.S. Application Data

(63) Continuation of application No. PCT/JP2023/044743, filed on Dec. 13, 2023.

(30) Foreign Application Priority Data

Dec. 19, 2022 (JP) .................................. 2022-202232
Dec. 6, 2023 (JP) .................................. 2023-206062

(51) Int. Cl.
   *G06F 21/55* (2013.01)
(52) U.S. Cl.
   CPC ...... *G06F 21/554* (2013.01); *G06F 2221/034* (2013.01)
(58) Field of Classification Search
   None
   See application file for complete search history.

(56) References Cited

U.S. PATENT DOCUMENTS 10,086,782 B1 * 10/2018 Konrardy ......... G08G 1/096783
10,404,737 B1 *  9/2019 Sweeney ............. G06F 16/2228
(Continued)

FOREIGN PATENT DOCUMENTS

JP       2005-196675 A      7/2005
JP       2019-175070 A     10/2019
(Continued)

OTHER PUBLICATIONS

Notice of Reasons for Refusal issued in Japanese Counterpart Patent Appl. No. 2023-206062, dated Aug. 9, 2024, along with an English translation thereof.

(Continued)

*Primary Examiner* — Kaveh Abrishamkar
(74) *Attorney, Agent, or Firm* — GREENBLUM & BERNSTEIN, P.L.C.

(57) ABSTRACT

An information notification method includes: obtaining a plurality of incident information items on a plurality of incidents caused by cyber attacks on a monitoring target during a first period in past; determining, based on the plurality of incident information items obtained, for each type of the plurality of incidents, an incident trend of incidents of the type in the monitoring target during a second period in the future and a priority of a provisional response or a permanent response to an incident of the type; and notifying of the incident trend and the priority that are determined for each type of the plurality of incidents.

28 Claims, 17 Drawing Sheets

(56) References Cited

U.S. PATENT DOCUMENTS

| | | | |
|---|---|---|---|
| 2011/0185432 A1* | 7/2011 | Sandoval | H04L 63/1433 |
| | | | 726/25 |
| 2012/0215575 A1* | 8/2012 | Deb | G06Q 10/0635 |
| | | | 705/500 |
| 2017/0279828 A1* | 9/2017 | Savalle | H04L 63/1416 |
| 2017/0279834 A1* | 9/2017 | Vasseur | H04L 43/024 |
| 2018/0013639 A1* | 1/2018 | Sanders | G06N 20/00 |
| 2018/0124091 A1* | 5/2018 | Sweeney | G06F 21/554 |
| 2019/0253447 A1* | 8/2019 | Sweeney | H04L 63/14 |
| 2020/0092319 A1 | 3/2020 | Spisak et al. | |
| 2020/0210894 A1 | 7/2020 | Mimura et al. | |
| 2020/0311615 A1* | 10/2020 | Jammalamadaka | G06N 20/20 |
| 2021/0116256 A1* | 4/2021 | Konrardy | G06Q 50/265 |
| 2022/0201042 A1* | 6/2022 | Crabtree | G06F 16/2477 |
| 2022/0413907 A1 | 12/2022 | Sekiya et al. | |

FOREIGN PATENT DOCUMENTS

| | | |
|---|---|---|
| JP | 2021-149260 A | 9/2021 |
| WO | 2019/163160 A1 | 8/2019 |

OTHER PUBLICATIONS

International Search Report (ISR) issued in WIPO Patent Application No. PCT/JP2023/044743, dated Mar. 5, 2024, along with an English translation thereof.
Written Opinion of the International Searching Authority (WO/ISA) issued in WIPO Patent Application No. PCT/JP2023/044743, dated Mar. 5, 2024, along with an English translation thereof.
Office Action dated May 17, 2025 issued in Chinese patent application No. 202380053660.3 along with an English translation.
Search Report issued in Chinese patent application No. 202380053660.3 along with an English translation.

* cited by examiner

FIG. 5

| ID | Date | Incident type | Occurrence count |
|---|---|---|---|
| 1 | 2024/1/1 | Incident No.1 | 15 |
| 2 | 2024/1/2 | Incident No.1 | 23 |
| ... | ... | ... | ... |
| 100 | 2024/5/3 | Incident No.10 | 3 |
| 101 | 2024/5/4 | Incident No.2 | 1 |
| ... | ... | ... | ... |

FIG. 6

| Date and time |
|---|
| 2024/1/1 15:10 |
| 2024/1/1 15:11 |
| ... |
| 2024/5/3 17:15 |
| 2024/5/4 17:16 |
| ... |

FIG. 7

| Incident type | | |
|---|---|---|
| Method of attack | Severity | ... |
| Remote attack | Severe | ... |
| Remote attack | Severe | ... |
| ... | ... | ... |
| Local attack | Minor | ... |
| Local attack | Minor | ... |
| ... | ... | ... |

FIG. 8

| Occurrence frequency |
|---|
| High |
| Extremely high |
| ... |
| Low |
| Extremely low |
| ... |

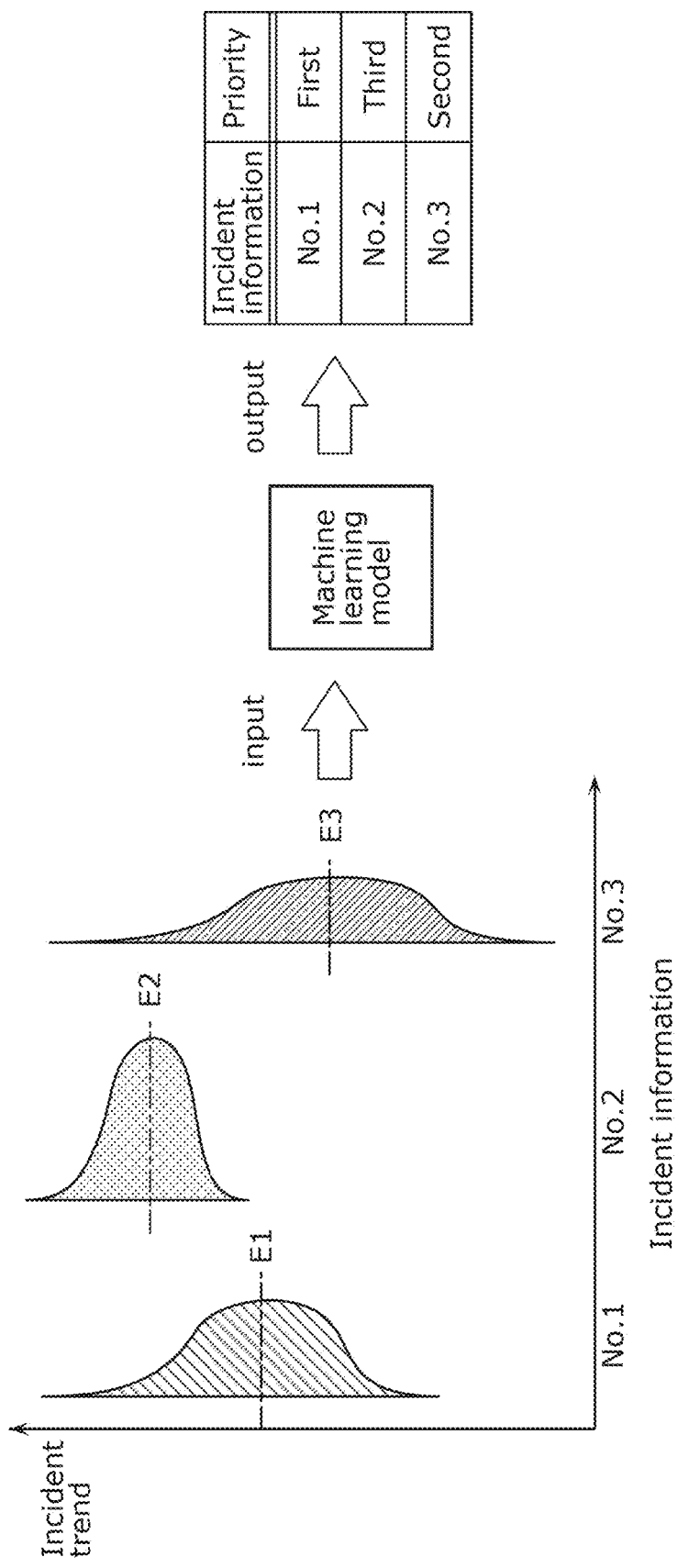

FIG. 23

| Incident information | No.1 | No.2 | No.3 |
|---|---|---|---|
| Expectation | 2 points (second) | 3 points (first) | 1 point (third) |
| Maximum value | 3 points (first) | 2 points (second) | 1 point (third) |
| Variance | 2 points (second) | 1 point (third) | 3 points (first) |
| Score | 7 points (first) | 6 points (second) | 5 points (third) |

FIG. 24

| No.1 | | | |
|---|---|---|---|
| Rank | Large | Middle | Small |
| Expectation | 3 points | 2 points | 1 point |
| Maximum value | 5 points | 3 points | 1 point |
| Variance | 3 points | 2 points | 1 point |

No.1's score: 2 + 5 + 2 = 9 points

INFORMATION NOTIFICATION METHOD AND INFORMATION NOTIFICATION DEVICE

CROSS REFERENCE TO RELATED APPLICATIONS

This is a continuation application of PCT International Patent Application No. PCT/JP2023/044743 filed on Dec. 13, 2023, designating the United States of America, which is based on and claims priority of Japanese Patent Application No. 2022-202232 filed on Dec. 19, 2022 and Japanese Patent Application No. 2023-206062 filed on Dec. 6, 2023.

FIELD

The present disclosure relates to an information notification method and an information notification device.

BACKGROUND

Patent Literature (PTL) 1 discloses an alert notification device that performs cluster analysis based on characteristics of incidents that occur, and determines a high priority for an incident that is more seemed to be an anomaly, based on a result of the analysis, and notifies of an alert.

CITATION LIST

Patent Literature

PTL 1: Japanese Unexamined Patent Application Publication No. 2019-175070

SUMMARY

However, the technique according to PTL 1 can be improved upon. In view of this, the present disclosure provides an information notification method or the like capable of improving upon the above related art.

An information notification method according to an aspect of the present disclosure includes: obtaining a plurality of incident information items on a plurality of incidents caused by cyber attacks on a monitoring target during a first period in past; determining, based on the plurality of incident information items obtained, for each type of the plurality of incidents, an incident trend of incidents of the type in the monitoring target during a second period in future and a priority of a provisional response or a permanent response to an incident of the type; and presenting the incident trend and the priority that are determined for each type of the plurality of incidents.

It should be noted that general or specific aspects of the present disclosure may be realized as a system, a device, an integrated circuit, a computer program, a non-transitory computer-readable recording medium such as a CD-ROM, or any given combination thereof.

According to the above-described aspect, an information notification method or the like according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 5 is a table showing a specific example of incident statistical information.

FIG. 6 is a table showing another example of the incident statistical information.

FIG. 7 is a table showing another example of the incident statistical information.

FIG. 8 is a table showing another example of the incident statistical information.

FIG. 22 is a diagram for describing a sixth example of the priority determination method in Variation 4.

FIG. 23 is a diagram for describing a seventh example of the priority determination method in Variation 4.

FIG. 24 is a diagram for describing an eighth example of the priority determination method in Variation 4.

Figure 1:
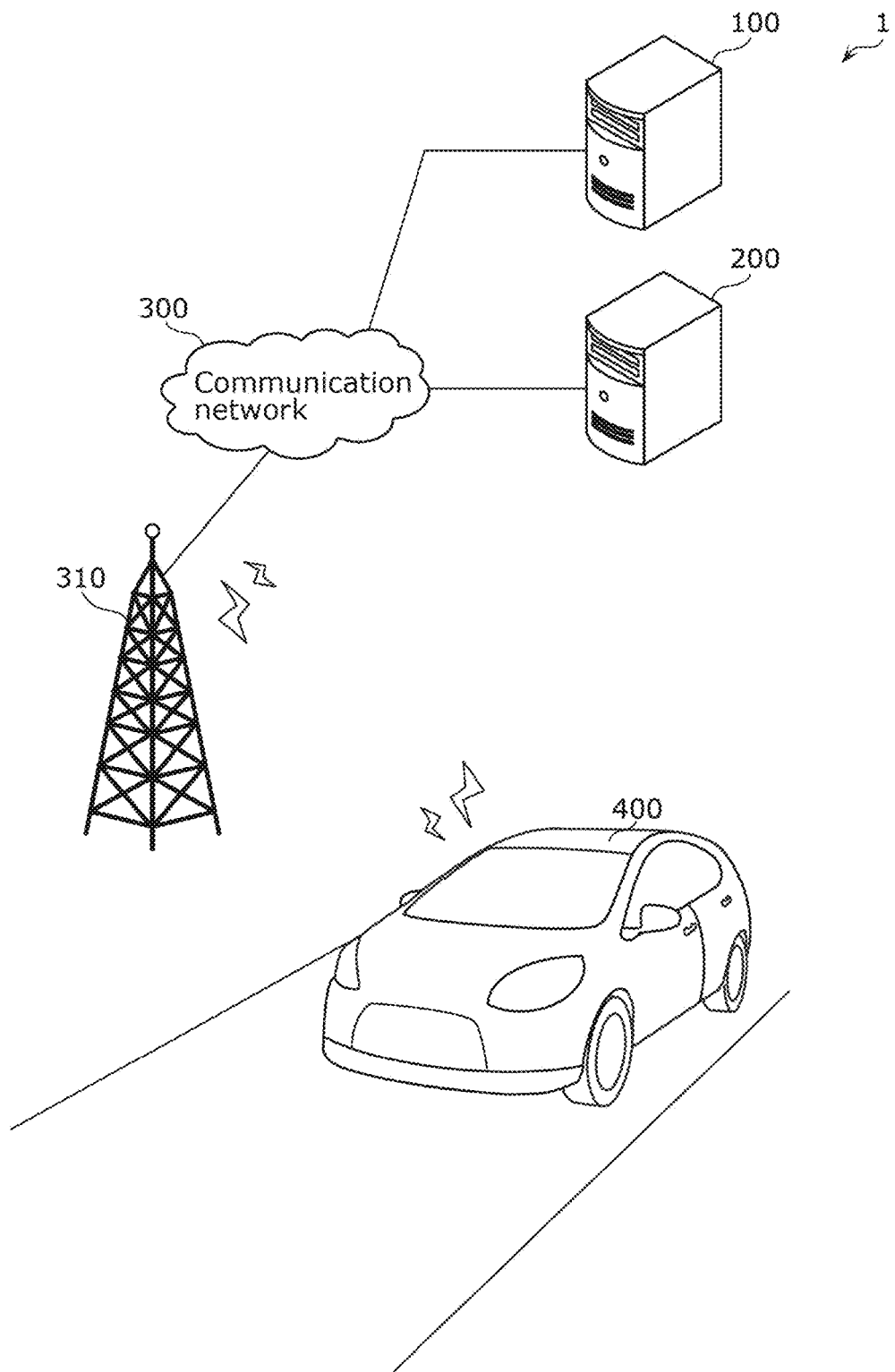
FIG. 1 is a schematic view of an information notification system according to an embodiment.

DESCRIPTION OF EMBODIMENT (Underlying Knowledge Forming Basis of the Present Disclosure)

The main purpose of the technique according to PTL 1 is to give a high priority to an incident that is more seemed to be an anomaly, out of incidents that are notified of in large quantity, and thus the technique cannot give a high priority to incidents that cause damage expected to escalate in the future. This fact is described in detail below.

When an information security vulnerability is found in a piece of equipment such as a vehicle, a plurality of cyber attacks of the same type may occur in the piece of equipment or another piece of equipment of the same model as the piece of equipment. Therefore, to minimize damage caused by the cyber attacks, a security incident response team (SIRT) should determine a provisional response or a permanent response in an early stage and respond to the cyber attacks.

However, the provisional response is, for example, fail soft (breakdown), which has a significant impact on end users. Thus, it is difficult to determine to perform a provisional response as a response to a cyber attack in a situation where information for decision-making is insufficient. In addition, in a permanent response, it is difficult to respond to a plurality of incidents simultaneously with a limited number of members of a SIRT.

As a result of intensive studies, the inventors have found an information notification method and the like capable of providing information for decision-making to make it accurate and easy to determine whether to carry out the provisional response and determination of a response priority of the permanent response.

An information notification method according to a first aspect of the present disclosure includes: obtaining a plurality of incident information items on a plurality of incidents caused by cyber attacks on a monitoring target during a first period in past; determining, based on the plurality of incident information items obtained, for each type of the plurality of incidents, an incident trend of incidents of the type in the monitoring target during a second period in future and a priority of a provisional response or a permanent response to an incident of the type; and presenting the incident trend and the priority that are determined for each type of the plurality of incidents.

Therefore, it is possible to provide information for decision-making to make it accurate and easy to determine whether to carry out a provisional response and determination of a response priority of a permanent response. For example, when a SIRT receives a notification, the SIRT can execute a provisional response or a permanent response in an early stage and can easily determine whether to carry out the provisional response and a priority of carrying out the permanent response. Accordingly, it is possible to preferentially respond to an incident that will have a great impact on security even with a limited number of members.

An information notification method according to a second aspect of the present disclosure is the information notification method according to the first aspect, wherein the priority being a higher priority indicates that the provisional response or the permanent response is made earlier, and based on the incident trend, the priority is determined to be higher with an increase in potential future damage caused by a cyber attack.

Accordingly, it is possible to preferentially respond to an incident in which a cyber attack will cause great potential future damage even with a limited number of members.

An information notification method according to a third aspect of the present disclosure is the information notification method according to the second aspect, wherein the incident trend relates to change over time in occurrence count of incidents for each type of the plurality of incidents.

Therefore, for example, when a SIRT receives the notification, the SIRT can easily grasp a future incident trend of incident information.

An information notification method according to a fourth aspect of the present disclosure is the information notification method according to the third aspect, wherein the incident trend is a slope of the change over time at a first time point in the second period, and the priority is determined to be higher with an increase in the slope.

Accordingly, a priority of a response is determined to be higher for an incident that has a steeper slope and has an increasing tendency. Thus, it is possible to promote a more prioritized response for an incident that has a steeper slope and has an increasing tendency.

An information notification method according to a fifth aspect of the present disclosure is the information notification method according to the third aspect, wherein the incident trend is a curve illustrating the change over time during the second period, and the priority is determined to be higher with an increase in a maximum value of the curve.

Accordingly, a priority of a response is determined to be higher for an incident that has a curve with a larger maximum value. Thus, it is possible to promote a more prioritized response for an incident that has a curve with a larger maximum value.

An information notification method according to a sixth aspect of the present disclosure is the information notification method according to the third aspect, wherein the incident trend is a curve illustrating the change over time during the second period, and the priority is determined to be higher with an increase in a time during which the curve is greater than a given occurrence count.

Accordingly, a priority of a response for an incident having a longer time during which its curve is greater than the given occurrence count is determined to be higher. Thus, it is possible to promote a more prioritized response for an incident having a longer time during which its curve is greater than the given occurrence count.

An information notification method according to a seventh aspect of the present disclosure is the information notification method according to the third aspect, wherein the incident trend is a total count of occurrence counts of incidents during the second period, and the priority is determined to be higher with an increase in the total count.

Accordingly, a priority of a response is determined to be higher for an incident that causes a higher total count of occurrence counts of incident information items during the second period. Thus, it is possible to promote a more prioritized response for an incident that causes a higher total count of occurrence counts of incident information items during the second period.

An information notification method according to an eighth aspect of the present disclosure is the information notification method according to the third aspect, wherein the incident trend is a total count of occurrence counts of incidents during the second period, and the priority is determined to be higher with an increase in a total amount of damage that is calculated by multiplying the total count by an amount of damage that occurs when one incident occurs.

Accordingly, a priority of a response is determined to be higher for an incident that will result in a larger total amount of damage. Thus, it is possible to promote a more prioritized response for an incident that will result in a larger total amount of damage.

An information notification method according to a ninth aspect of the present disclosure is the information notification method according to any one of the first to eighth aspects, wherein the incident trend includes a distribution of a plurality of index values that are likely to be determined in an index indicating the incident trend in the determining.

Therefore, it is possible to determine a priority with consideration given to a likelihood of prediction of an incident trend.

An information notification method according to a tenth aspect of the present disclosure is the information notification method according to the ninth aspect, wherein the distribution is given by a probability density function with a random variable that is the index indicating the incident trend.

Therefore, it is possible to determine a priority with consideration given to an occurrence probability of an incident trend.

An information notification method according to an eleventh aspect of the present disclosure is the information notification method according to the ninth aspect, wherein the distribution is given by a first range that includes the plurality of index values. Therefore, it is possible to determine a priority with consideration given to a distribution of an incident trend.

An information notification method according to a twelfth aspect of the present disclosure is the information notification method according to any one of the ninth to eleventh aspects, wherein the priority is determined to be higher with an increase in an expectation based on the distribution.

An information notification method according to a thirteenth aspect of the present disclosure is the information notification method according to any one of the ninth to eleventh aspects, wherein the priority is determined to be higher with an increase in a maximum value of the plurality of index values.

An information notification method according to a fourteenth aspect of the present disclosure is the information notification method according to any one of the ninth to eleventh aspects, wherein the priority is determined to be higher with an increase in a variance in the distribution.

An information notification method according to a fifteenth aspect of the present disclosure is the information notification method according to any one of the ninth to eleventh aspects, wherein the priority is determined to be higher with an increase in a proportion that is calculated based on the distribution and is accounted for by a distribution of index values greater than or equal to a first threshold value in the index.

An information notification method according to a sixteenth aspect of the present disclosure is the information notification method according to any one of the ninth to eleventh aspects, wherein the priority is determined using a machine learning model generated by machine learning using, as an input, a plurality of incident trends corresponding to a plurality of first incident information items that are issued during a third period in the past and using, as ground truth data, a first evaluation value determined for each of the plurality of incident trends.

An information notification method according to a seventeenth aspect of the present disclosure is the information notification method according to any one of the ninth to eleventh aspects, wherein a precedence based on the priority is determined using a machine learning model generated by machine learning using, as an input, a plurality of incident trends corresponding to a plurality of first incident information items that are issued during a third period in the past and using, as ground truth data, a precedence determined for each of the plurality of incident trends.

An information notification method according to an eighteenth aspect of the present disclosure is the information notification method according to any one of the ninth to eleventh aspects, wherein the determining further includes: calculating at least two second evaluation values for each of the plurality of incidents by ranking the plurality of incidents according to each of at least two values among: an expectation based on the distribution; a maximum value of the plurality of index values; a variance in the distribution; a proportion that is calculated based on the distribution and is accounted for by a distribution of index values greater than or equal to a first threshold value in the index; and an evaluation value determined using a machine learning model based on a plurality of incident trends corresponding to a plurality of first incident information items that are issued during a third period in the past; and calculating a third evaluation value for each of the plurality of incidents by adding up the at least two second evaluation values, and the priority is determined to be higher with an increase in the third evaluation value.

An information notification method according to a nineteenth aspect of the present disclosure is the information notification method according to any one of the ninth to eleventh aspects, wherein the determining further includes calculating a fourth evaluation value for each of the plurality of incidents, in the calculating of the fourth evaluation value, for each of the plurality of incidents, at least two fifth evaluation values are determined according to at least two values among: an expectation based on the distribution; a maximum value of the plurality of index values; a variance in the distribution; a proportion that is calculated based on the distribution and is accounted for by a distribution of index values greater than or equal to a first threshold value in the index; and an evaluation value determined using a machine learning model based on a plurality of incident trends corresponding to a plurality of first incident information items that are issued during a third period in the past, and the fourth evaluation value is calculated by adding up the at least two fifth evaluation values, and the priority is determined to be higher with an increase in the fourth evaluation value.

An information notification method according to a twentieth aspect of the present disclosure is the information notification method according to any one of the first to eighth aspects, wherein the determining includes determining, for each type of the plurality of incidents and for each model of monitoring targets: an incident trend of incidents of the type and the model during the second period in the future, the monitoring targets each being the monitoring target; and a priority of a provisional response or a permanent response to an incident of the type and the model.

Therefore, it is possible to determine a priority of a provisional response or a permanent response for each incident type and for each monitoring target model.

An information notification method according to a twenty first aspect of the present disclosure is the information notification method according to any one of the first to eighth aspects, wherein the determining further includes calculating, for each type of the plurality of incidents, a total amount of damage by multiplying a total occurrence count of incident information items of the type by an amount of damage that occurs when an incident information item of the type is issued, and the priority is determined to be higher with an increase in the total amount of damage.

Therefore, it is possible to determine a priority based on a total amount of damage.

An information notification method according to a twenty second aspect of the present disclosure is the information notification method according to any one of the first to eighth aspects, further including: calculating, for each type of the plurality of incidents, an index value about an occurrence count of incidents of the type during the second period, based on the incident trend determined for each type of the plurality of incidents; and notifying of recommendation of the provisional response when the index value is greater than a reference value.

Therefore, it is possible to notify of recommendation of a provisional response when an index value about an occurrence count during the second period is greater than the reference value.

An information notification method according to a twenty third aspect of the present disclosure is the information notification method according to the tenth aspect, further including: calculating a sixth evaluation value for each type of the plurality of incidents based on the incident trend determined for each type of the plurality of incidents; and notifying of recommendation of the provisional response when the sixth evaluation value is greater than a reference value.

Therefore, it is possible to notify of recommendation of a provisional response when a sixth evaluation value is greater than the reference value.

An information notification method according to a twenty fourth aspect of the present disclosure is the information notification method according to any one of the first to twenty second aspects, wherein the incident trend is determined using a machine learning model generated by machine learning using, as an input, a plurality of first incident information items that are issued during a third period in the past and using, as ground truth data, a track record of an incident trend based on a plurality of second incident information items that are issued during a fourth period in the past, the fourth period being later than the third period.

Therefore, it is possible to predict a future incident trend of incident information by using a machine learning model.

An information notification method according to a twenty fifth aspect of the present disclosure is the information notification method according to any one of the first to twenty second aspects, further including: determining a total amount of damage caused by a cyber attack during the second period by using a machine learning model generated by machine learning using, as an input, a plurality of first incident information items that are issued during a third period in the past and using, as ground truth data, a total amount of damage based on a plurality of second incident information items that are issued during a fourth period in the past, the fourth period being later than the third period.

Therefore, it is possible to predict a total amount of damage caused by a future cyber attack by using a machine learning model.

An information notification method according to a twenty sixth aspect of the present disclosure is the information notification method according to any one of the first to twenty second aspects, wherein the incident trend is determined using a correlation between a plurality of first incident information items issued during a third period in the past and a track record of an incident trend based on a plurality of second incident information items issued during a fourth period in the past, the fourth period being later than the third period.

Therefore, it is possible to predict an incident trend based on a past track record.

An information notification method according to a twenty seventh aspect of the present disclosure is the information notification method according to any one of the first to twenty second aspects, further including: determining a total amount of damage caused by a cyber attack during the second period by using a correlation between a plurality of first incident information items issued during a third period in the past and a track record of a total amount of damage based on a plurality of second incident information items issued during a fourth period in the past, the fourth period being later than the third period.

Therefore, it is possible to predict a total amount of damage caused by a future cyber attack based on a past track record.

An information notification device according to an twenty eighth aspect of the present disclosure includes: a processor; and memory connected to the processor, wherein, by using the memory, the processor operates as: an obtainer that obtains a plurality of incident information items on a plurality of incidents caused by cyber attacks on a monitoring target during a first period in past; a determiner that determines, based on the plurality of incident information items obtained, for each type of the plurality of incidents, an incident trend of incidents of the type in the monitoring target during a second period in future and a priority of a provisional response or a permanent response to an incident of the type; and a presenter that presents the incident trend and the priority that are determined for each type of the plurality of incidents.

Therefore, it is possible to provide information for decision-making to make it accurate and easy to determine whether to carry out the provisional response and determination of a response priority of the permanent response. For example, when a SIRT receives a notification, the SIRT can execute the provisional response or the permanent response in an early stage and can easily determine whether to carry out the provisional response and a priority of carrying out the permanent response. Accordingly, it is possible to preferentially respond to an incident that will have a great impact on security even with a limited number of members.

It should be noted that general or specific aspects of the present disclosure may be realized as a system, a method, an integrated circuit, a computer program, a non-transitory computer-readable recording medium such as a CD-ROM, or any given combination thereof.

Hereinafter, an information notification method and an information notification device according to an aspect of the present disclosure is described in detail with reference to the Drawings. It should be noted that the embodiment described below shows a specific example of the present disclosure. The numerical values, shapes, materials, constituent elements, the arrangement and connection of the constituent elements, steps, the order of the steps, etc., in the following embodiment are mere examples, and therefore do not intend to limit the present disclosure. Moreover, among the constituent elements in the following embodiment, constituent elements not recited in any one of the independent claims which indicate the broadest concepts of the present disclosure are described as arbitrary constituent elements.

Embodiment

Hereinafter, an embodiment is described with reference to FIG. 1 to FIG. 10.

[Configuration]

FIG. 1 is a schematic view of an information notification system according to the embodiment.

More specifically, FIG. 1 illustrates security monitoring device 100, information notification device 200, vehicle 400, communication network 300, and base station 310 of a mobile communication network. Security monitoring device 100, information notification device 200, and vehicle 400 are communicatively connected to send and receive information between each other via communication network 300.

Security monitoring device 100 is a device that monitors a state of vehicle 400. For example, security monitoring device 100 may have functions of a monitoring center (security operation center (SOC)) and SIRT. Security monitoring device 100 obtains, as a function of the monitoring center, log information periodically from vehicle 400 and monitors the state of vehicle 400 based on the obtained log information. More specifically, security monitoring device 100 determines the presence or absence of a cyber attack on vehicle 400, based on the log information. By reducing time to next obtainment of the log information from vehicle 400, security monitoring device 100 can determine the presence or absence of a cyber attack on vehicle 400 substantially in real time. When determining the presence of a cyber attack on vehicle 400, security monitoring device 100 transmits incident information obtained from the determination to information notification device 200.

In addition, security monitoring device 100 obtains, as a function of the SIRT, notification information that indicates a predicted incident trend and a priority from information notification device 200 and presents the notification information to a member of the SIRT. Security monitoring device 100 accepts an input of response information that is generated through development referring to notification information from a member of a SIRT and transmits the response information to vehicle 400.

Note that the function of the monitoring center and the function of the SIRT that security monitoring device 100 has may be implemented by separate devices. To be more specific, in this case, a first device having the function of the monitoring center obtains the log information from vehicle 400 and outputs the generated incident information to information notification device 200. A second device having the function of the SIRT obtains the notification information from information notification device 200 and outputs the generated response information to vehicle 400.

Note that although one vehicle 400 is illustrated in FIG. 1, information notification system 1 may include a plurality of vehicles 400. More specifically, security monitoring device 100 may obtain log information periodically from each of the plurality of vehicles 400, determine the presence or absence of a cyber attack for each of the plurality of vehicles 400, and transmit incident information obtained for each of the plurality of vehicles 400 to information notification device 200. Security monitoring device 100 generates the incident information when determining the presence of a cyber attack on vehicle 400, and does not generate the incident information when determining the absence of a cyber attack on vehicle 400. Security monitoring device 100 is implemented by a computer, such as a server.

Information notification device 200 is a device that determines, based on a plurality of incident information items in the past, for each type of the plurality of incident information items, a future incident trend of incident information items of the type and a priority of a provisional response or a permanent response to an incident information item of the type and notifies of the determined incident trend and the priority. Information notification device 200 obtains a plurality of incident information items from security monitoring device 100 and, based on the plurality of incident information items obtained, estimates, for each type of the plurality of incident information items, a future incident trend of incident information items of the type. Information notification device 200 is implemented by a computer, such as a server.

Vehicle 400 is an automated vehicle that is capable of autonomous driving. Vehicle 400 includes a presenter that presents information. Vehicle 400 controls an operation of vehicle 400 according to a received instruction. More specifically, according to the instruction, vehicle 400 may cause the presenter to present the information or control an operation related to motion of vehicle 400 (hereinafter, will be referred to as a motion operation). For example, vehicle 400 may be a vehicle used in a carsharing service or a vehicle used in a taxi service. Vehicle 400 is not limited to an automated vehicle capable of autonomous driving and may be an automobile that has a driver assistance function such as an ADAS function.

Note that, in the present embodiment, security monitoring device 100 and information notification device 200 are separated. However, this should not be construed as limiting. Security monitoring device 100 and information notification device 200 may be integrated together. That is, security monitoring device 100 may have the functions of information notification device 200.

Figure 2:
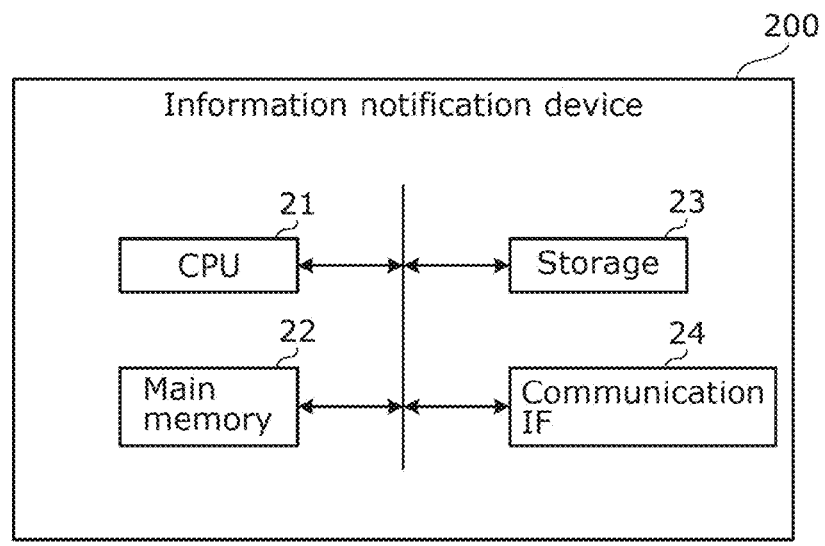
FIG. 2 is a block diagram illustrating an example of a hardware configuration of an information notification device according to the embodiment.

FIG. 2 is a block diagram illustrating an example of a hardware configuration of the information notification device according to the embodiment.

As illustrated in FIG. 2, information notification device 200 has, as the hardware configuration, central processing unit (CPU) 21, main memory 22, storage 23, and communication interface (communication IF) 24.

CPU 21 is a processor that executes a program stored in storage 23 or the like.

Main memory 22 is a volatile storage area used as a work area when CPU 21 executes the program.

Storage 23 is a nonvolatile storage area that holds the program, incident information, and the like.

Communication IF 24 is a communication interface that communicates with security monitoring device 100 via communication network 300. Communication IF 24 is, for example, a wired LAN interface. Note that communication IF 24 may be a wireless LAN interface. Furthermore, communication IF 24 is not limited to a LAN interface and may be any communication interface that is capable of establishing a communication connection with the communication network.

Figure 3:
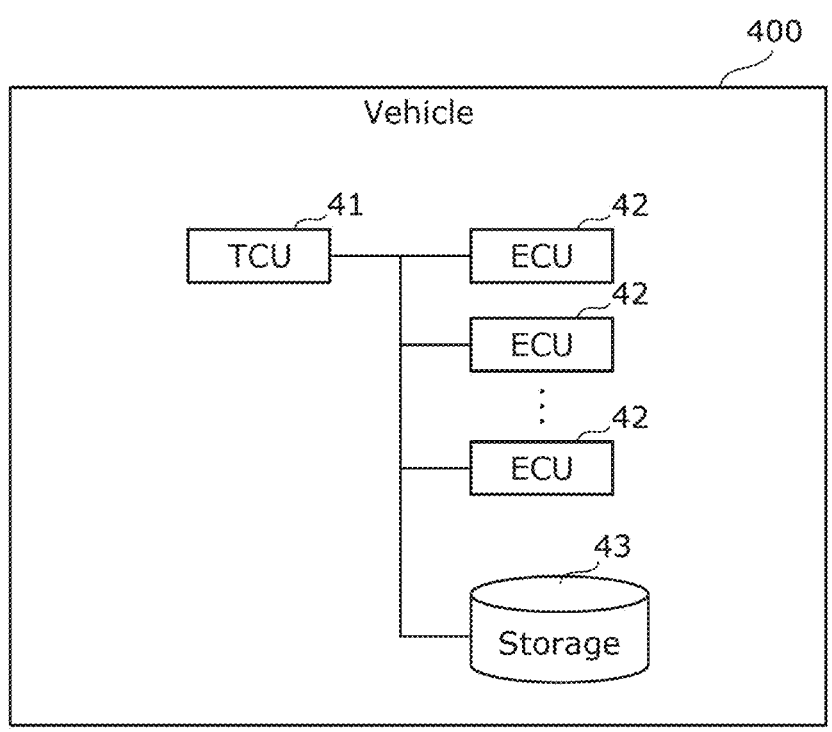
FIG. 3 is a block diagram illustrating an example of a hardware configuration of a vehicle according to the embodiment.

FIG. 3 is a block diagram illustrating an example of a hardware configuration of the vehicle according to the embodiment.

As illustrated in FIG. 3, vehicle 400 has, as a hardware configuration, telematics control unit (TCU) 41, a plurality of ECUs 42, and storage 43.

TCU 41 is a communication unit that enables vehicle 400 to perform wireless communication with communication network 300. TCU 41 is a communication unit including a cellular module that meets a mobile communication network standard.

The plurality of ECUs 42 are control circuits that control pieces of equipment included in vehicle 400. Examples of the pieces of equipment included in vehicle 400 include an engine, a motor, a meter, a transmission, brakes, steering, power windows, and an air conditioner. Furthermore, at least one of the plurality of ECUs 42 is a control circuit that controls the autonomous driving of vehicle 400. The plurality of ECUs 42 may be provided corresponding to these various pieces of equipment. Although not illustrated here, each of the plurality of ECUs 42 may include a storage (a nonvolatile storage area) that stores a program to be executed by ECU 42. The storage is, for example, a nonvolatile memory.

Storage 43 is a nonvolatile storage area that holds a control program and the like. Storage 43 is implemented by, for example, a hard disk drive (HDD), a solid stated drive (SSD), or the like.

Figure 4:
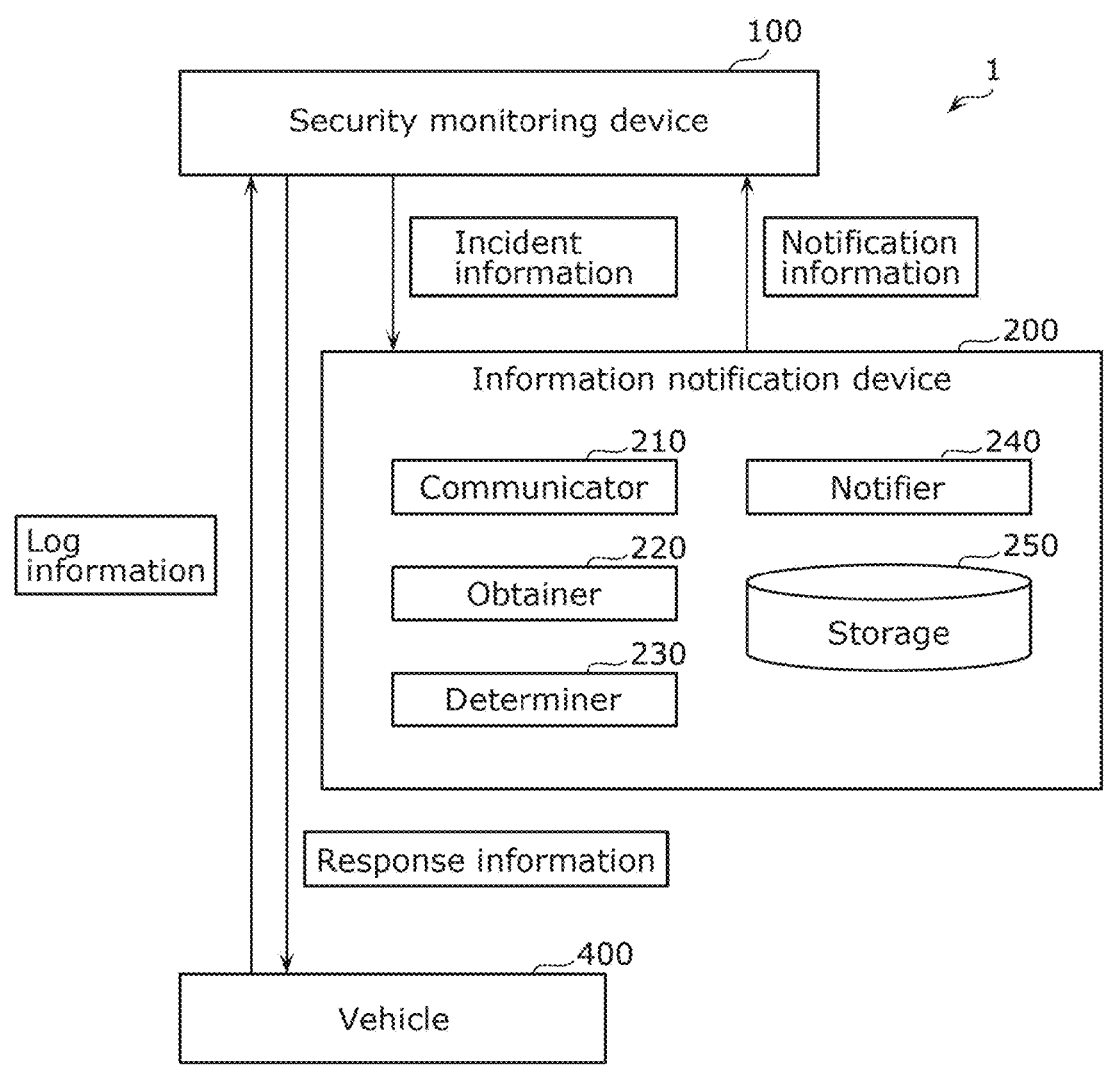
FIG. 4 is a block diagram illustrating an example of a functional configuration of the information notification system according to the embodiment.

Next, functional configurations of information notification device 200 and vehicle 400 of information notification system 1 will be described. FIG. 4 is a block diagram illustrating an example of a functional configuration of the information notification system according to the embodiment. Note that communication network 300 is omitted in FIG. 4.

First, the functional configuration of information notification device 200 will be described.

Information notification device 200 includes communicator 210, obtainer 220, determiner 230, notifier 240, and storage 250.

Communicator 210 sends and receives information to and from security monitoring device 100 via communication network 300. More specifically, communicator 210 receives incident information from security monitoring device 100. The incident information received by communicator 210 is accumulated in storage 250. In addition, communicator 210 transmits notification information to security monitoring device 100. Note that communicator 210 is implemented by communication IF 24.

FIG. 5 is a table showing a specific example of incident statistical information.

The incident statistical information is information generated based on incident information items that are caused by cyber attacks on vehicle 400 as a monitoring target during a past first period. As illustrated in FIG. 5, the incident statistical information, which is accumulated in storage 250, includes ID, date, incident type, and occurrence count. The incident statistical information is statistical information about incident information that is generated based on a plurality of incident information items accumulated. The ID is information for identifying, for example, incidents of the same type that occur on the same day. The date indicates a date on which an incident occurs. The incident type indicates a type of an incident that occurs. For example, incident type is indicated by numbers. The occurrence count indicates a count of incidents of the same type that occur on the same day.

FIG. 6 is a table showing another example of the information included in the incident statistical information.

In FIG. 5, it is assumed that the incident statistical information includes a date on which an incident occurs as the information about an occurrence time point of the incident. Instead, as illustrated in FIG. 6, the incident statistical information may include a date and time at which an incident occurs.

FIG. 7 is a table showing another example of the information included in the incident statistical information.

The incident type in FIG. 5 is assumed to be indicated by a number indicating an incident type. However, this should not be construed as limiting. As illustrated in FIG. 7, the incident type may be indicated by information that represents characteristics of an incident type such as a method of attack and its severity or a feasibility of attack.

FIG. 8 is a table showing another example of the information included in the incident statistical information.

In FIG. 5, it is assumed that the incident statistical information includes an occurrence count that indicates a count of incidents of the same type that occur on the same day. However, this should not be construed as limiting. As illustrated in FIG. 8, the incident statistical information may include an occurrence frequency. For example, the occurrence frequency is defined in a graded manner according to counts of occurrences per day. The occurrence frequency may be classified into frequencies in five levels: "extremely low", "low", "middle", "high", and "extremely high". The number of levels of frequencies is not limited to five. The number may be two to four or may be six or more.

Note that vehicle 400 targeted for the cyber attacks is an example of a monitoring target. Note that the monitoring target is not limited to vehicle 400. The monitoring target may be any device equipped with a computer and having a function that enables communication with an external network. That is, the application of the information notification system is not limited to monitoring a vehicle. The information notification system may be applied to IoT monitoring, server monitoring, building monitoring, factory monitoring, monitoring of a movable body such as an aircraft or a watercraft, or the like.

Return to the description using FIG. 4.

Obtainer 220 obtains, from storage 250, the plurality of incident information items that are caused by cyber attacks on vehicle 400 during the past first period. Note that obtainer 220 is not limited to obtaining, from storage 250, the plurality of incident information items that are issued during the first period. Obtainer 220 may obtain the plurality of incident information items from security monitoring device 100 and may obtain the incident statistical information.

Based on the plurality of incident information items obtained or the incident statistical information, determiner 230 determines, for each incident information type, an incident trend of incident information items of the type in vehicle 400 during a future second period and a priority of a provisional response or a permanent response to an incident information item of the type. More specifically, determiner 230 first determines the incident trend of the incident information of the type during the future second period (hereinafter, referred to as a "predicted incident trend") and then determines the priority of the provisional response or the permanent response to the incident information of the type. The predicted incident trend relates to change over time in occurrence count of incident information items for each type.

Figure 9:
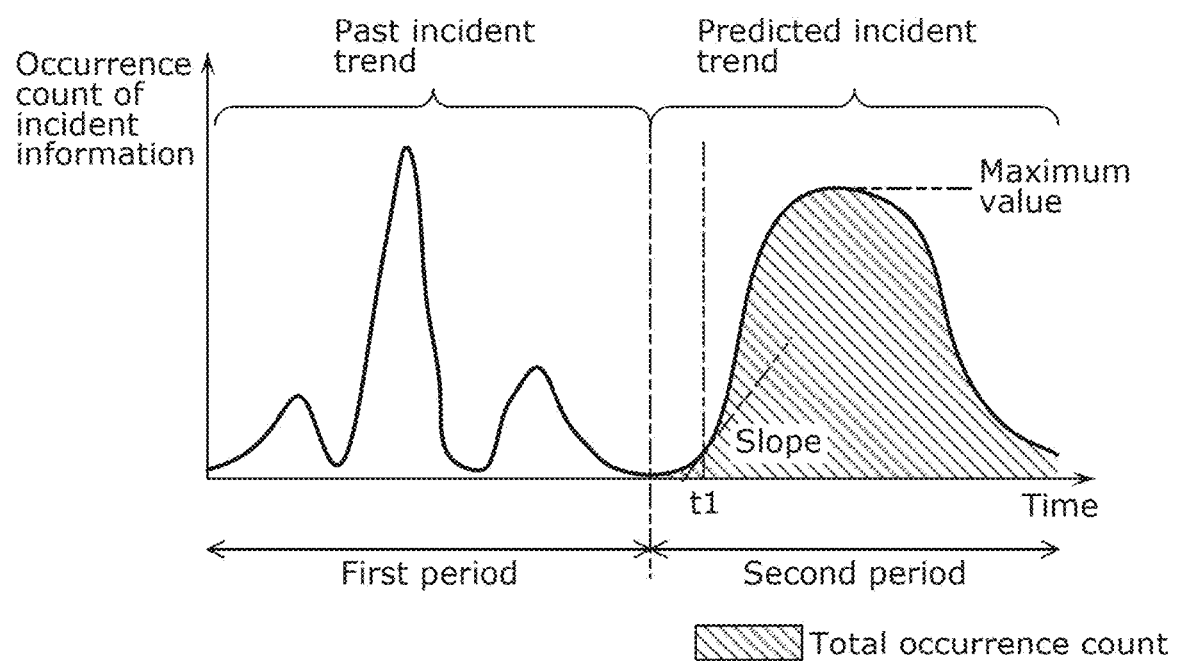
FIG. 9 is a graph illustrating change over time in occurrence count of incident information items.

FIG. 9 is a graph illustrating change over time in occurrence count of incident information items.

For example, the predicted incident trend is a slope of the change over time in occurrence count of incident information items of each type at first time point t1 in the second period. That is, the predicted incident trend is a slope of a tangential line of the graph of the change over time at first time point t1. Alternatively, the predicted incident trend may be, for example, a curve (graph) illustrating change over time in occurrence count of incidents during the second period. Alternatively, the predicted incident trend may be, for example, a total count of occurrence counts of incident information items during the second period. That is, the predicted incident trend may be the area between the curve illustrating the occurrence count during the second period and a line indicating that the occurrence count is zero in FIG. 9 (i.e., the area of the hatched zone in FIG. 9).

The predicted incident trend may be determined by using, for example, machine learning. In this case, the predicted incident trend is determined using a machine learning model generated by machine learning using, as an input, a plurality of first incident information items that are issued during a past third period and using, as ground truth data, a track record of an incident trend based on a plurality of second incident information items that are issued during a past fourth period later than the third period.

Alternatively, the predicted incident trend may be determined by using, for example, a rule-based model. In this case, the predicted incident trend is determined using a correlation between the plurality of first incident information items issued during the past third period and the track record of the incident trend based on the plurality of second incident information items issued during the past fourth period later than the third period.

After determining the predicted incident trend, determiner 230 determines, based on the incident trend of the incident information of each type, the priority of each type to be higher with an increase in potential future damage caused by a cyber attack. A higher priority indicates that the corresponding provisional response or the permanent response is made earlier. The priority may be determined to be higher with an increase in the slope as the predicted incident trend. The priority may be determined to be higher with an increase in the maximum value of the curve as the predicted incident trend. The priority may be determined to be higher with an increase in a time during which the curve as the predicted incident trend is greater than a given occurrence count. The priority may be determined to be higher with an increase in the total count of occurrence counts of the incident information items during the second period as the predicted incident trend.

Return to the description using FIG. 4.

Notifier 240 notifies of the predicted incident trend and the priority that are determined for each type of incident information. More specifically, notifier 240 transmits notification information indicating the predicted incident trend and the priority to security monitoring device 100 via communicator 210.

Obtainer 220, determiner 230, and notifier 240 are implemented by CPU 21, main memory 22, and the like. Storage 250 is implemented by storage 23.

[Operation]

Figure 10:
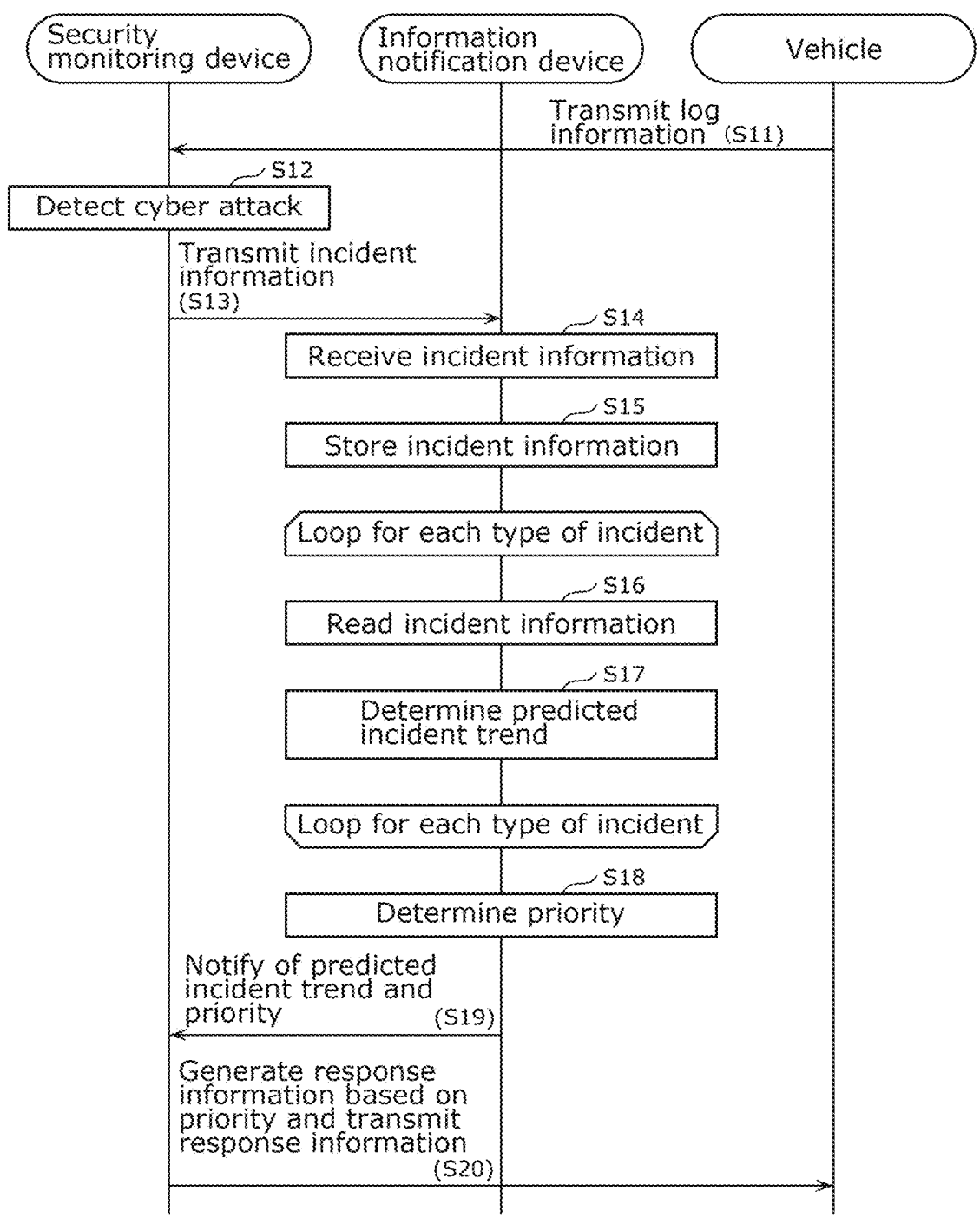
FIG. 10 is a sequence diagram illustrating an example of an information notification method executed by the information notification system according to the embodiment.

FIG. 10 is a sequence diagram illustrating an example of an information notification method executed by the information notification system according to the embodiment.

Vehicle 400 transmits the log information to security monitoring device 100 (S11). For example, the log information indicates a control status of vehicle 400, a detection value of a sensor included in vehicle 400, or the like.

Security monitoring device 100 detects the presence of a cyber attack on vehicle 400 based on the log information (S12).

Based on the cyber attack, security monitoring device 100 generates the above-mentioned incident information and transmits the incident information to information notification device 200 (S13).

Information notification device 200 receives the incident information (S14).

Information notification device 200 stores the received incident information in storage 250 (S15).

Information notification device 200 loops step S16 and step S17 for each type of incident.

Information notification device 200 reads incident information of a type targeted for processing from storage 250 (S16). The incident information read here includes a plurality of incident information items generated at cyber attacks that occur during the past first period.

Based on the plurality of incident information items generated at the cyber attacks occurring during the past first period, information notification device 200 determines the predicted incident trend (S17).

Based on the predicted incident trend, information notification device 200 determines the priority of each type of incident (S18). Information notification device 200 notifies security monitoring device 100 of the predicted incident trend and the priority (S19).

Referring to information on the obtained predicted incident trend and the priority, security monitoring device 100 determines whether to carry out a provisional response and details of the response or gives a priority of a permanent response for each incident type. Security monitoring device 100 accepts an input of response information that is used for causing vehicle 400 to execute a provisional response or a permanent response to respond to an incident for each type and generated by a member of the SIRT, and transmits the accepted response information to vehicle 400 (S20).

Note that the priority may be relative between a plurality of incident types or may be an absolute one calculated by comparison with a predetermined reference.

The provisional response is, for example, a response to stop a function involving a vulnerability that results in a cause of a cyber attack or to stop a function that will be affected by the vulnerability. Note that, in a case where there are a plurality of methods for a provisional response responding to a target incident type, a method for the provisional response may be determined using a priority of each type of incident.

The permanent response is, for example, a response to execute a software update to overcome the vulnerability that results in the cause of the cyber attack.

[Advantageous Effects Etc.]

The information notification method according to the present embodiment includes: obtaining the plurality of incident information items caused by cyber attacks on vehicle 400 (the monitoring target) during the past first period; based on the plurality of incident information items obtained, determining, for each type of the plurality of incident information items, the incident trend (the predicted incident trend) of incident information items of the type in vehicle 400 (the monitoring target) during the future second period and the priority of the provisional response or the permanent response to an incident information item of the type; and notifying of the predicted incident trend and the priority that are determined for each type of the plurality of incident information items.

Therefore, it is s possible to provide information for decision-making to make it accurate and easy to determine whether to carry out the provisional response and determination of a response priority of the permanent response. For example, when the SIRT receives the notification, the SIRT can easily determine whether to carry out the provisional response and the priority of carrying out the permanent response, thus executing the provisional response or the permanent response in an early stage. Accordingly, it is possible to preferentially respond to an incident that will have a great impact on security even with a limited number of members.

In addition, in the information notification method according to the present embodiment, a higher priority indicates that the provisional response or the permanent response is made earlier, and based on the incident trend, the priority is determined to be higher with an increase in potential future damage caused by a cyber attack. Accordingly, it is possible to preferentially respond to an incident in which a cyber attack will cause great potential future damage even with a limited number of members.

In addition, in the information notification method according to the present embodiment, the predicted incident trend relates to the change over time in occurrence count of the incident information items for each type. Therefore, for example, when the SOC or the SIRT receives the notification, the SOC or the SIRT can easily grasp a future incident trend of incident information. Accordingly, it is possible to perform efficient monitoring and response through changing a personnel distribution or the like.

In addition, in the information notification method according to the present embodiment, the predicted incident trend is the slope of the change over time at the first time point in the second period. In addition, the priority is determined to be higher with an increase in the slope. Accordingly, the priority of the response is determined to be higher for an incident that has a steeper slope and has an increasing tendency. Thus, it is possible to promote a more prioritized response for an incident that has a steeper slope and has an increasing tendency.

In addition, in the information notification method according to the present embodiment, the predicted incident trend is the curve illustrating the change over time during the second period. In addition, the priority is determined to be higher with an increase in the maximum value of the curve. Accordingly, the priority of the response is determined to be higher for an incident that has a curve with a larger maximum value. Thus, it is possible to promote a more prioritized response for an incident that has a curve with a larger maximum value.

In addition, in the information notification method according to the present embodiment, the priority is determined to be higher with an increase in the time during which the curve is greater than the given occurrence count. Accordingly, a priority of a response for an incident having a longer time during which its curve is greater than or equal to the given occurrence count is determined to be higher. Thus, it is possible to promote a more prioritized response for an incident having a longer time during which its curve is greater than or equal to the given occurrence count.

In addition, in the information notification method according to the present embodiment, the predicted incident trend is the total count of occurrence counts of the incident information items during the second period. In addition, the priority is determined to be higher with an increase in the total count. Accordingly, the priority of the response is determined to be higher for an incident that causes a higher total count of occurrence counts during the second period. Thus, it is possible to promote a more prioritized response for an incident that causes a higher total count of occurrence counts during the second period.

In addition, in the information notification method according to the present embodiment, the predicted incident trend is determined using the machine learning model generated by machine learning using, as an input, the plurality of first incident information items that are issued during the past third period and using, as ground truth data, the track record of the incident trend based on the plurality of second incident information items that are issued during the past fourth period later than the third period. Therefore, it is possible to predict the future incident trend of incident information by using the machine learning model.

In addition, in the information notification method according to the present embodiment, the predicted incident trend is determined using the correlation between the plurality of first incident information items issued during the past third period and the track record of the incident trend based on the plurality of second incident information items issued during the past fourth period later than the third period. Therefore, it is possible to predict the incident trend based on the past track record.

Variation (1) Variation 1

In the above-described embodiment, the reading of the incident information (S16) and the determination of the predicted incident trend (S17) are performed for each type of incident, and the priority is determined for each type of incident. However, this should not be construed as limiting.

Figure 11:
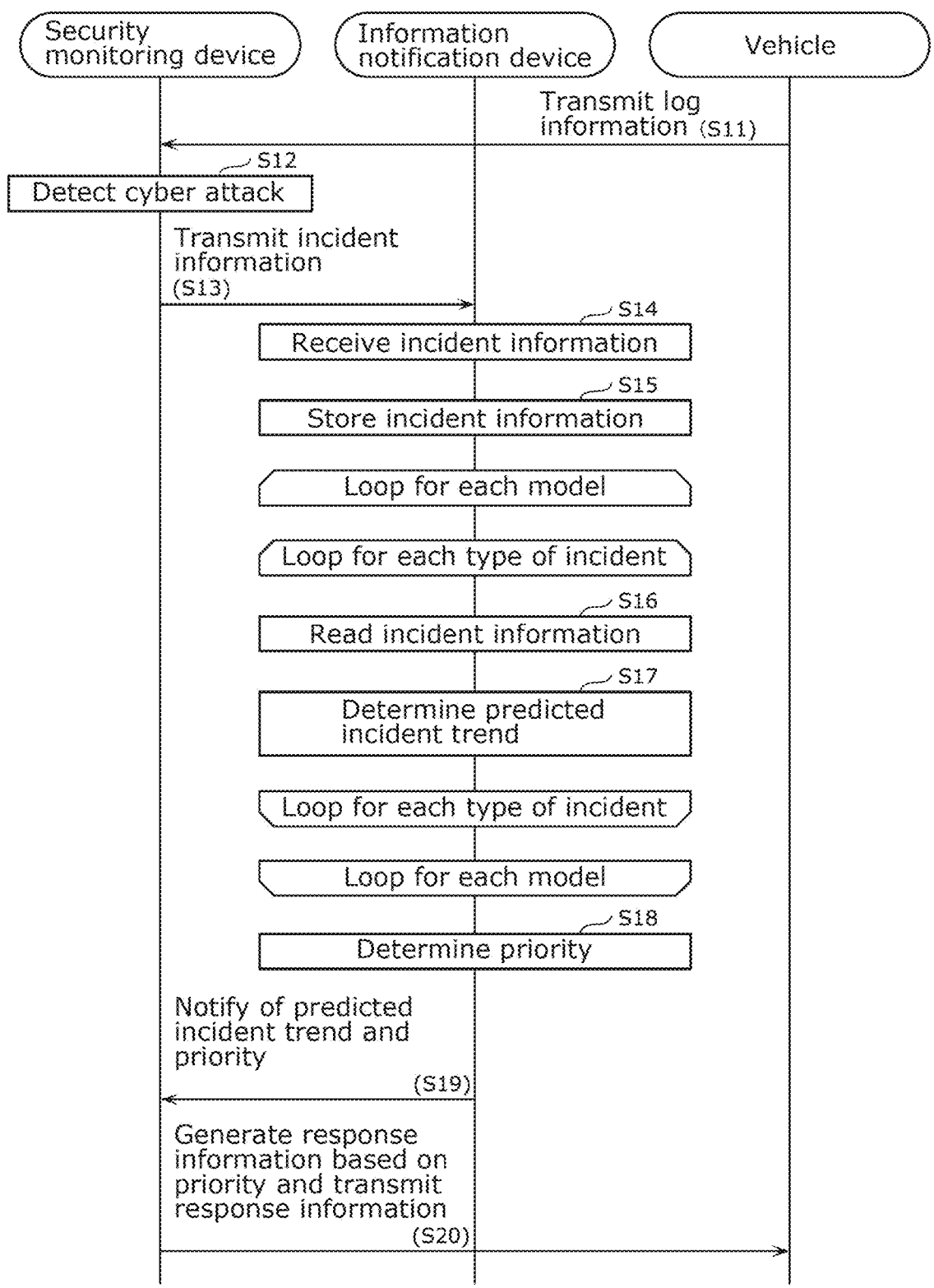
FIG. 11 is a sequence diagram illustrating an example of an information notification method executed by an information notification system according to Variation 1.

FIG. 11 is a sequence diagram illustrating an example of an information notification method executed by an information notification system according to Variation 1. Note that, in FIG. 11, the same processing as in the embodiment will be denoted by the same reference sign as in FIG. 10, and the description thereof will be omitted.

For example, as illustrated in FIG. 11, further for each model of vehicles 400 (i.e., monitoring targets), the reading of the incident information (S16) and the determination of the predicted incident trend (S17) may be performed for each type of incident, and the priority may be determined for each type of incident. That is, the predicted incident trend and the priority may be determined for each model and for each type of incident. Likewise, the predicted incident trend and the priority may be determined for each type of incident and for each model.

(2) Variation 2

In the above-described embodiment, the priority is determined based on the predicted incident trend. However, the priority may be determined based on a total amount of damage that is further calculated from the predicted incident trend.

Figure 12:
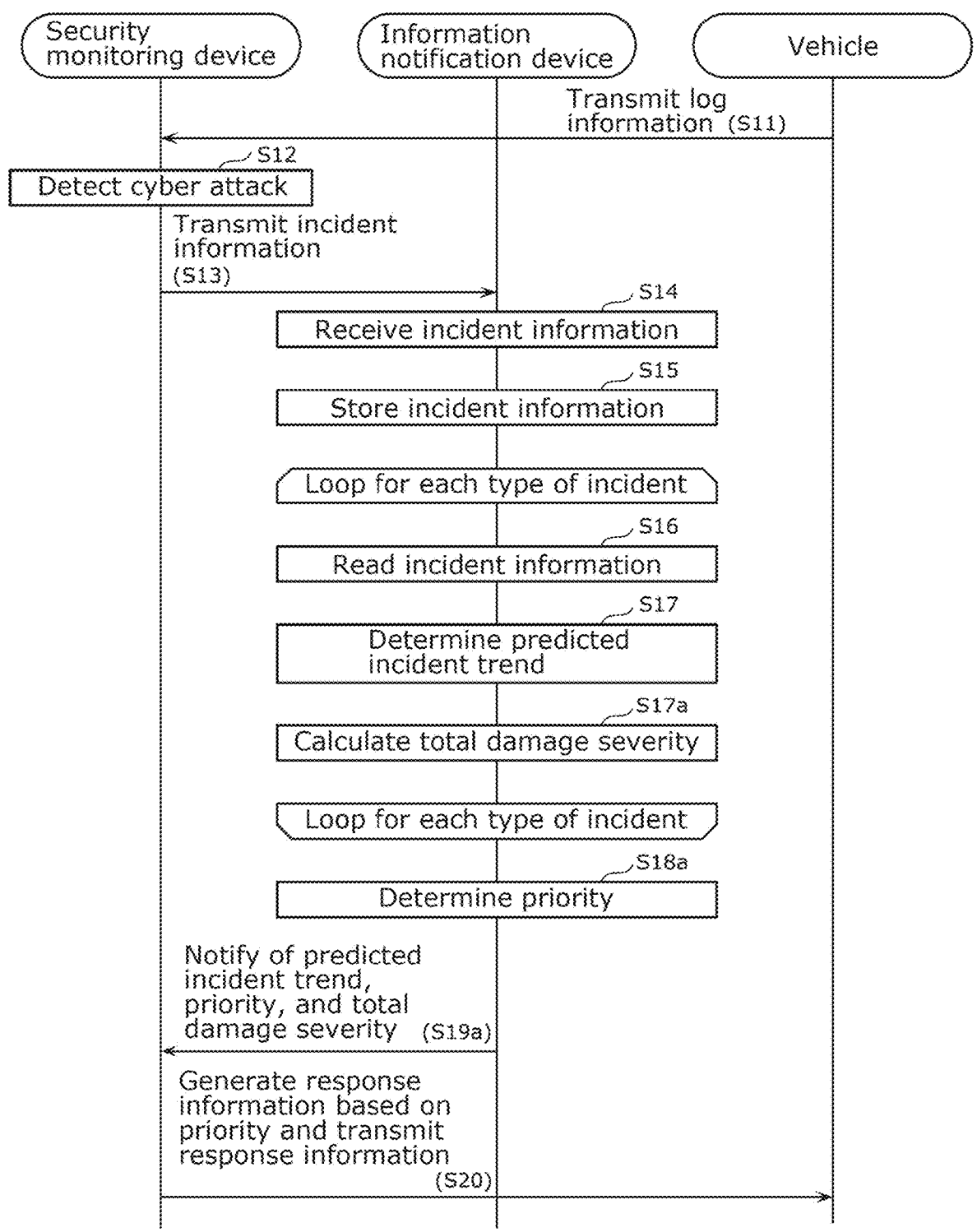
FIG. 12 is a sequence diagram illustrating an example of an information notification method executed by an information notification system according to Variation 2.

FIG. 12 is a sequence diagram illustrating an example of an information notification method executed by an information notification system according to Variation 2. Note that, in FIG. 12, the same processing as in the embodiment will be denoted the same reference sign as in FIG. 10, and the description thereof will be omitted.

After step S17, information notification device 200 determines a total amount of damage for each type of incident. For example, information notification device 200 calculates the total amount of damage (a total damage severity) by multiplying a total occurrence count of incident information items of the type by an amount of damage (a damage severity) that occurs when an incident information item of the type is issued.

Alternatively, the total amount of damage may be calculated using a machine learning model generated by machine learning using, as an input, the plurality of first incident information items that are issued during the past third period and using, as ground truth data, a track record of a total amount of damage based on the plurality of second incident information items that are issued during the past fourth period later than the third period.

Alternatively, the total amount of damage may be determined using the correlation between the plurality of first incident information items issued during the past third period and the track record of the total amount of damage based on the plurality of second incident information items issued during the past fourth period later than the third period.

Information notification device 200 determines the priority to be higher with an increase in the total amount of damage (total damage severity) (S18a).

Information notification device 200 notifies security monitoring device 100 of the predicted incident trend, the priority, and the total damage severity (S19a).

Accordingly, the priority of the response is determined to be higher for an incident that will result in a larger total amount of damage. Thus, it is possible to promote a more prioritized response for an incident that will result in a larger total amount of damage.

(3) Variation 3

Figure 13:
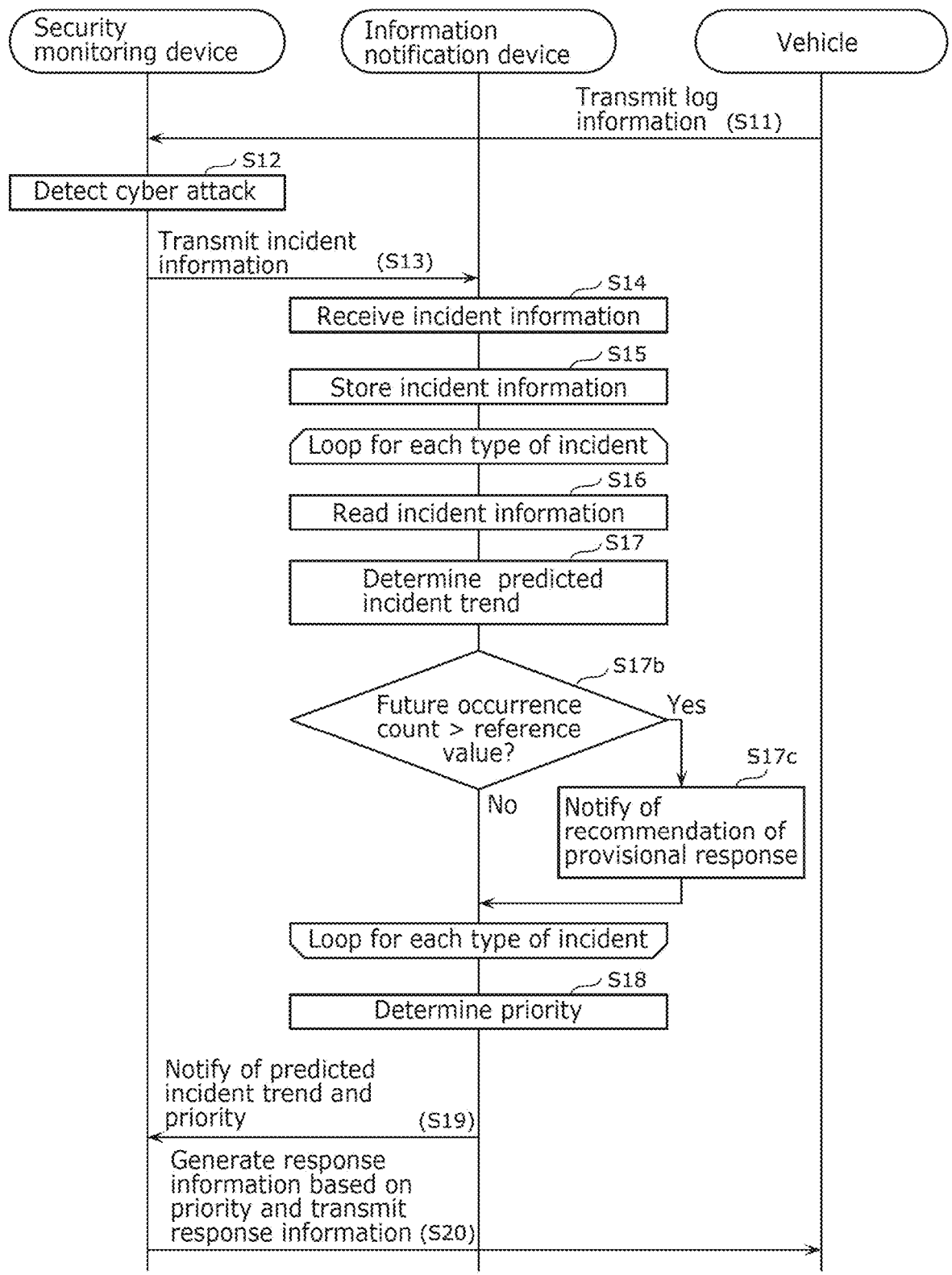
FIG. 13 is a sequence diagram illustrating an example of an information notification method executed by an information notification system according to Variation 3.

FIG. 13 is a sequence diagram illustrating an example of an information notification method executed by an information notification system according to Variation 3. Note that, in FIG. 13, the same processing as in the embodiment will be denoted the same reference sign as in FIG. 10, and the description thereof will be omitted.

After step S17, information notification device 200 determines whether a future occurrence count is greater than a reference value (S17b).

When the future occurrence count is greater than the reference value (Yes in S17b), information notification device 200 notifies security monitoring device 100 of recommendation to carry out the provisional response (S17c). Otherwise (No in S17b), information notification device 200 performs the next processing. It is not limited to determining whether the future occurrence count is greater than the reference value. It may be determined whether an occurrence probability obtained by dividing an occurrence count of incidents by the number of vehicles of each model is greater than a threshold value. In this case, when the occurrence probability is greater than the threshold value, step S17c is performed. Otherwise, the next processing is performed. It is not limited to determining whether the future occurrence count is greater than the reference value. The total amount of damage may be calculated for each type of incident, and it may be determined whether a future total amount of damage is greater than a threshold value may be determined. In this case, when the total amount of damage is greater than the threshold value, step S17c is performed. Otherwise, the next processing is performed.

As seen from the above, the incident trend is determined for each type of incident, and based on the incident trend of the type of incident, information notification device 200 calculates an index value about an occurrence count of the type of incident during the second period. The index value is, as mentioned above, the future occurrence count, the future occurrence probability, the future total amount of damage, or the like.

(4) Variation 4

In Variation 4, an incident trend of incident information of one type may include a distribution of a plurality of index values that are likely to be determined in an index indicating the incident trend. More specifically, the index indicating the incident trend is any one of the followings: (i) a slope of the change over time in occurrence count of incident information items of each type at first time point t1 in the second period, (ii) a maximum value of a curve (graph) illustrating change over time in occurrence count of incidents during the second period, (iii) a time during which the curve (graph) illustrating the change over time in occurrence count of incidents during the second period is greater than the given occurrence count, and (iv) the total count of occurrence counts of incident information items during the second period.

Figure 14:
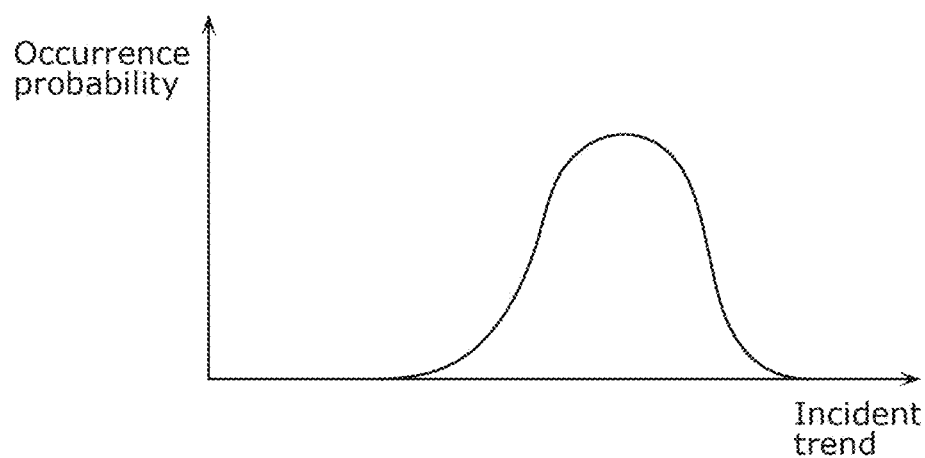
FIG. 14 is a graph illustrating an example of a probability density function with a random variable that is an index indicating an incident trend.

As illustrated in FIG. 14, the distribution of the plurality of index values may be given by a probability density function with a random variable that is an index indicating an incident trend corresponding to the distribution. FIG. 14 is a graph illustrating an example of the probability density function with the random variable that is the index indicating the incident trend. In the probability density function, its horizontal axis represents the incident trend, and its vertical axis represents the occurrence probability of the corresponding incident trend. For example, in a case where the incident trend is the slope of the change over time in occurrence count of incident information items of each type at first time point t1 in the second period, the probability density function represents the relation between a slope and the density of the occurrence probability of the slope.

Figure 15:
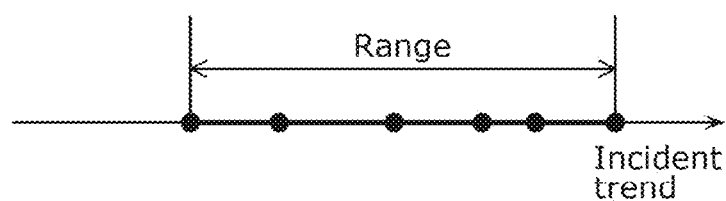
FIG. 15 is a diagram illustrating an example in which a distribution is given by a range including a plurality of index values that can take on in the index indicating the incident trend.

Alternatively, as illustrated in FIG. 15, the distribution of the plurality of index values may be given by a range including a plurality of index values that can take on in the index indicating the incident trend corresponding to the distribution. FIG. 15 is a diagram illustrating an example in which the distribution is given by the range including the plurality of index values that can take on in the index indicating the incident trend. A plurality of points in FIG. 15 illustrate the plurality of index values that can take on in the index indicating the incident trend. The range including the plurality of index values is represented by, for example, a range between a minimum value and a maximum value of the plurality of index values.

Figure 16:
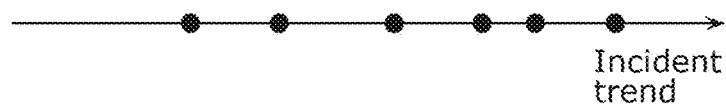
FIG. 16 is a diagram illustrating an example in which the distribution is given by the plurality of index values that can take on in the index indicating the incident trend.

Alternatively, as illustrated in FIG. 16, the distribution of the plurality of index values may be the distribution of the plurality of index values itself. FIG. 16 is a diagram illustrating an example in which the distribution is given by the plurality of index values that can take on in the index indicating the incident trend. A plurality of points in FIG. 16 illustrate the plurality of index values that can take on in the index indicating the incident trend.

Next, a priority determination method in a case where the distribution of the plurality of index values is given by the probability density function will be described.

Figure 17:
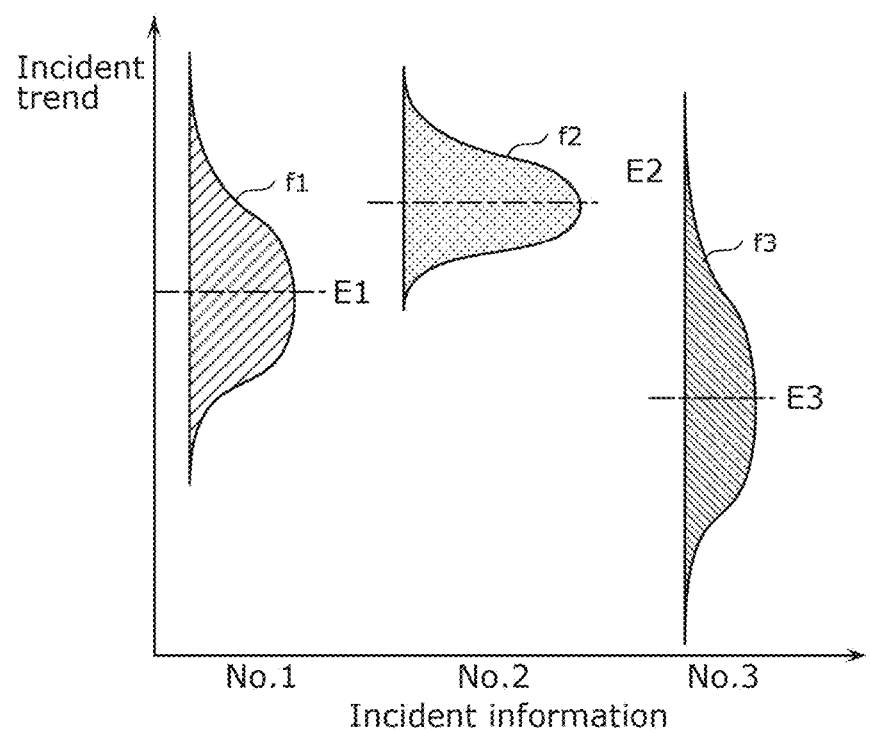
FIG. 17 is a diagram for describing a first example of a priority determination method in Variation 4.

FIG. 17 is a diagram for describing a first example of the priority determination method in Variation 4. FIG. 17 illustrates expectation E1 of the incident trend in probability density function f1 of incident information of type No. 1, expectation E2 of the incident trend in probability density function f2 of incident information of type No. 2, and expectation E3 of the incident trend in probability density function f3 of incident information of type No. 3. In the first example, the priority may be determined to be higher with an increase in the expectation based on the probability density function.

In a case of the example in FIG. 17, expectation E2 is larger than expectation E1, and expectation E1 is larger than expectation E3. Therefore, a priority of the incident information of No. 2 may be determined to be higher than a priority of the incident information of No. 1, and the priority of the incident information of No. 1 may be determined to be higher than a priority of the incident information of No. 3. Note that the incident information of No. 1, the incident information of No. 2, and the incident information of No. 3 are different in type from one another. The priority of incident information indicates a priority of the provisional response or the permanent response to the incident information.

Figure 18:
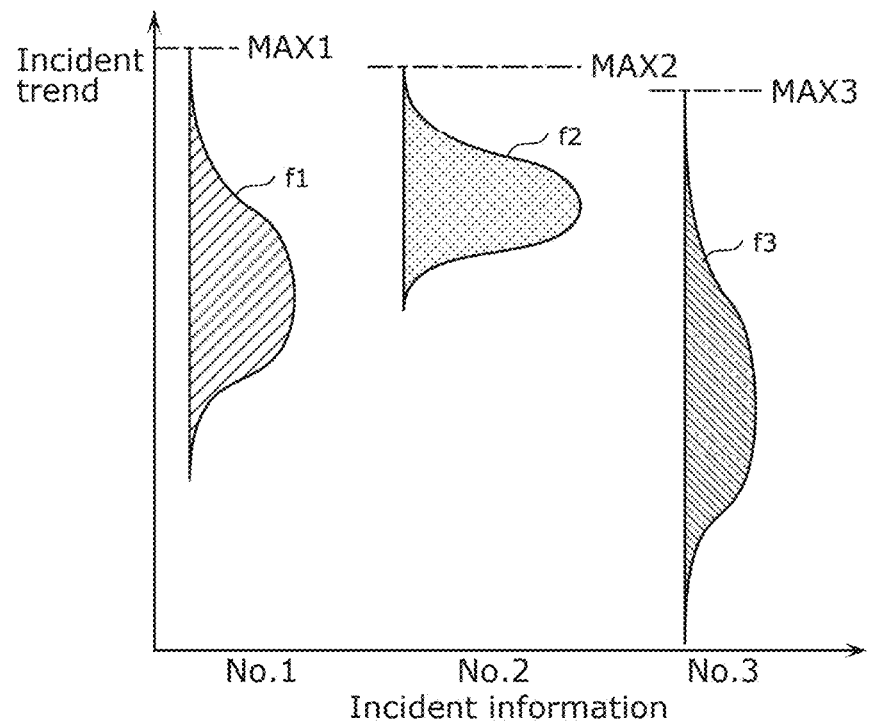
FIG. 18 is a diagram for describing a second example of the priority determination method in Variation 4.

FIG. 18 is a diagram for describing a second example of the priority determination method in Variation 4. FIG. 18 illustrates maximum value MAX1 of a domain of the incident trend in probability density function f1 of the incident information of type No. 1, maximum value MAX2 of a domain of the incident trend in probability density function f2 of the incident information of type No. 2, and maximum value MAX3 of a domain of the incident trend in probability density function f3 of incident information of type No. 3. In the second example, the priority may be determined to be higher with an increase in the maximum value of the domain of the incident trend in the probability density function.

In a case of the example in FIG. 18, maximum value MAX1 is larger than maximum value MAX2, and maximum value MAX2 is larger than maximum value MAX3. Therefore, the priority of the incident information of No. 1 may be determined to be higher than the priority of the incident information of No. 2, and the priority of the incident information of No. 2 may be determined to be higher than the priority of the incident information of No. 3.

Figure 19:
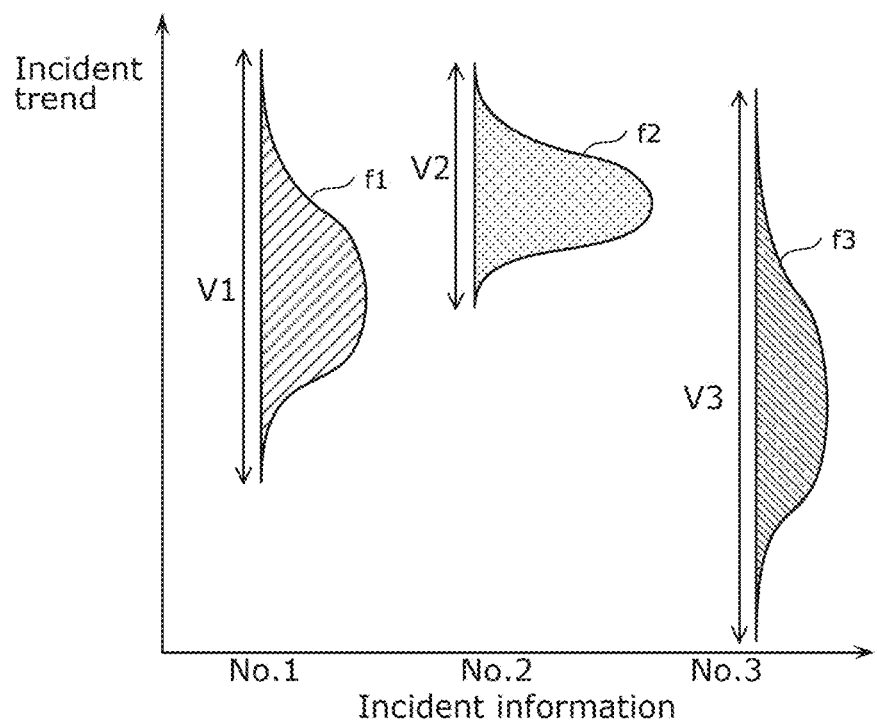
FIG. 19 is a diagram for describing a third example of the priority determination method in Variation 4.

FIG. 19 is a diagram for describing a third example of the priority determination method in Variation 4. FIG. 19 illustrates variance V1 of the incident trend in probability density function f1 of the incident information of type No. 1, variance V2 of the incident trend in probability density function f2 of the incident information of type No. 2, and variance V3 of the incident trend in probability density function f3 of incident information of type No. 3. Note that FIG. 19 is not a precise illustration of variance V1, variance V2, and variance V3 but a schematic view. In the third example, the priority may be determined to be higher with an increase in the variance based on the probability density function.

In a case of the example in FIG. 19, variance V3 is larger than variance V1, and variance V1 is larger than variance V2. Therefore, the priority of the incident information of No. 3 may be determined to be higher than the priority of the incident information of No. 1, and the priority of the incident information of No. 1 may be determined to be higher than a priority of the incident information of No. 2. As seen from the above, by determining the priority to be higher with an increase in variance, it is possible to determine the priority to be higher with an increase in variation in the incident trend. That is, it is possible to determine the priority to be higher with an increase in risk incurred by the incident trend.

Figure 20:
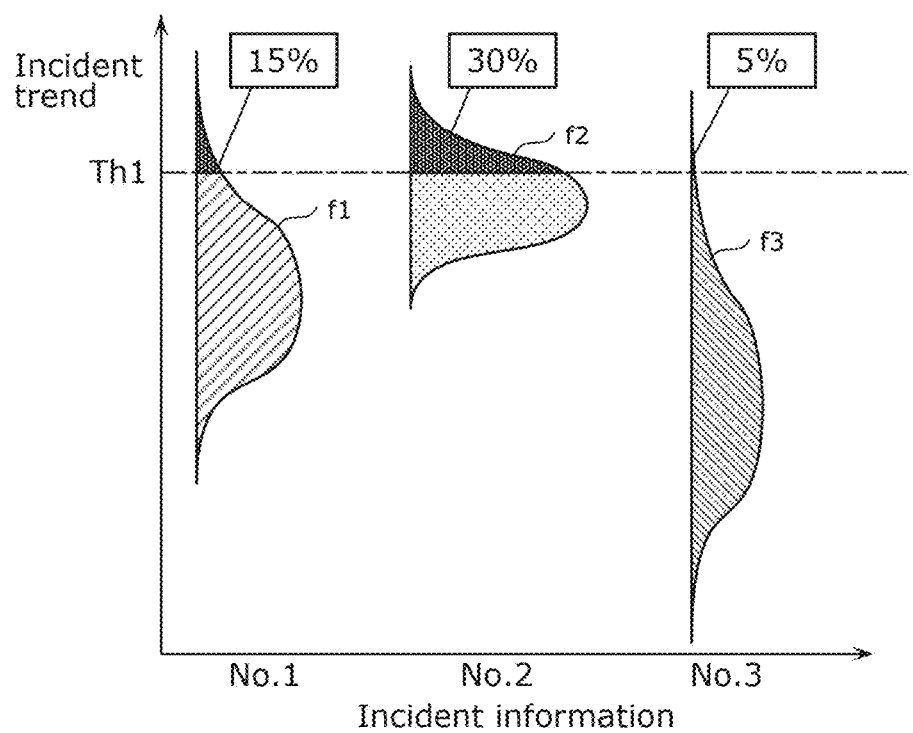
FIG. 20 is a diagram for describing a fourth example of the priority determination method in Variation 4.

FIG. 20 is a diagram for describing a fourth example of the priority determination method in Variation 4. FIG. 20 illustrates an occurrence probability (e.g., 15%) that the incident trend in probability density function f1 of the incident information of No. 1 is greater than or equal to threshold value Th1, an occurrence probability (e.g., 30%) that the incident trend in probability density function f2 of the incident information of No. 2 is greater than or equal to threshold value Th1, and an occurrence probability (e.g., 5%) that the incident trend in probability density function f3 of incident information of No. 3 is greater than or equal to threshold value Th1. In the fourth example, the priority may be determined to be higher with an increase in the occurrence probability that the random variable of the probability density function is greater than or equal to threshold value Th1.

Figure 21:
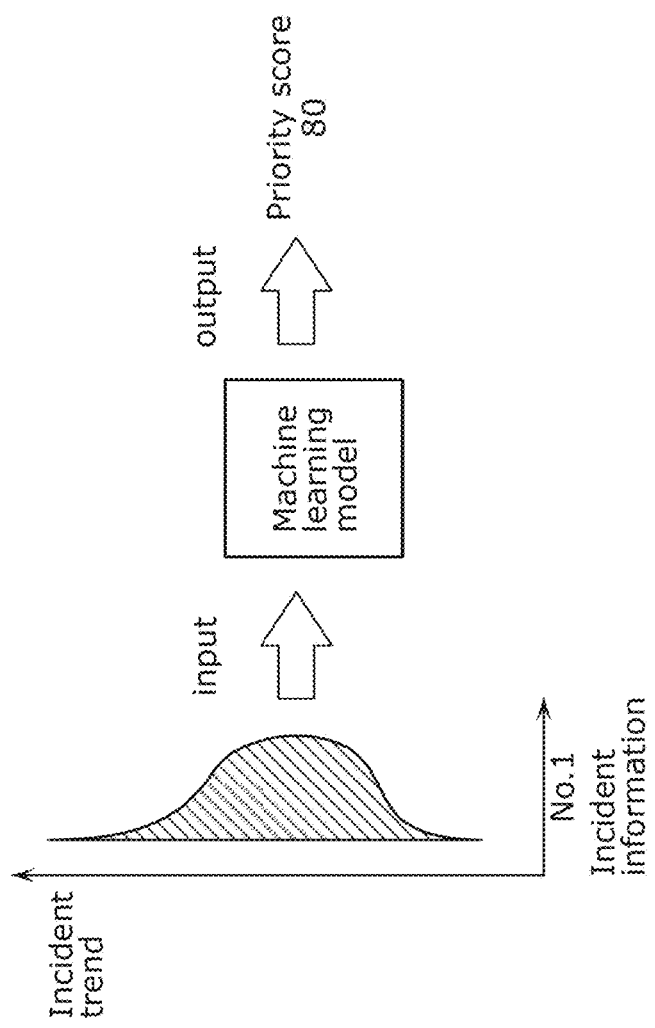
FIG. 21 is a diagram for describing a fifth example of the priority determination method in Variation 4.

FIG. 21 is a diagram for describing a fifth example of the priority determination method in Variation 4. The fifth example is an example of a priority determination method using a machine learning model. The machine learning model is generated by machine learning using, as an input, a plurality of incident trends corresponding to the plurality of first incident information items that are issued during the past third period and using, as ground truth data, an evaluation value determined for each of the plurality of incident trends. The evaluation values in the ground truth data are an example of first evaluation values. For example, the evaluation values in the ground truth data may be values determined by a person evaluating the incident trends or may be a score based on at least one of the expectation, maximum value, and variance used for calculating the priority determined based on the above-mentioned probability density function. By inputting an incident trend corresponding to incident information into the machine learning model, an evaluation value corresponding to the incident information is calculated. In the fifth example, the priority may be determined to be higher with an increase in the calculated evaluation value.

FIG. 22 is a diagram for describing a sixth example of the priority determination method in Variation 4. The sixth example is another example of the priority determination method using a machine learning model. The machine learning model is generated by machine learning using, as an input, a plurality of incident trends corresponding to a plurality of first incident information items of another type that are issued during the past third period and using, as ground truth data, a precedence determined for each of the plurality of incident trends. For example, the precedence in the ground truth data may be precedence determined by a person for the plurality of incident trends or may be precedence determined based on the priority determined based on the above-mentioned probability density function. In the latter case, the precedence is determined to be higher with an increase in the priority. By inputting, into the machine learning model, a plurality of incident trends corresponding to a plurality of incident information items that are different in type from one another, a precedence corresponding to each of the plurality of incident information items is determined. The higher a precedence of a type of incident information, the more preferentially the provisional response or the permanent response to the type of incident information is made.

FIG. 23 is a diagram for describing a seventh example of the priority determination method in Variation 4. In the seventh example, evaluation values corresponding to values of the expectation, the maximum value, and the variance determined in the first example to the third example are calculated. The evaluation values are an example of second evaluation values. For example, as illustrated in FIG. 23, for the incident information of No. 1, an evaluation value of expectation E1 is calculated to be 2 points because expectation E1 is the second largest value of expectations E1 to E3, an evaluation value of maximum value MAX1 is calculated to be 3 points because maximum value MAX1 is the largest value of maximum values MAX1 to MAX3, and an evaluation value of variance V1 is calculated to be 2 points because variance V1 is the second largest value of variances V1 to V3. Likewise, evaluation values of expectation E2, maximum value MAX2, and variance V2 of the incident information of No. 2 are calculated, and evaluation values of expectation E3, maximum value MAX3, and variance V3 of the incident information of No. 3 are calculated. As seen from the above, evaluation values for each of an expectation, a maximum value, and a variance are calculated by ranking a plurality of incident information items according to a corresponding one of the expectation, the maximum value, and the variance. For example, an evaluation value is calculated to be higher as the incident information item is ranked higher.

Then, the evaluation value of expectation, the evaluation value of maximum value, and the evaluation value of variance calculated for each type of incident information are added up, and thus a score is calculated for each type. The scores are an example of third evaluation values. Accordingly, a score of the incident information of No. 1 is calculated to be 7 points, a score of the incident information of No. 2 is calculated to be 6 points, and a score of the incident information of No. 3 is calculated to be 5 points.

In the seventh example, an example of calculating evaluation values corresponding to an expectation, a maximum value, and a variance determined in the first example to the third example has been described. However, evaluation values may be calculated based on at least two values among: an expectation; a maximum value; a variance; a proportion of a distribution of index values greater than or equal to threshold value Th1 calculated based on the distributions in the fourth example to the sixth example; and an evaluation value determined using a machine learning model.

As seen from the above, when determining the priority, information notification device 200 calculates at least two second evaluation values for each of a plurality of incidents by ranking the plurality of incidents according to each of at least two values among: an expectation based on a probability density function; a maximum value of a domain of a random variable; a variance and proportion in the probability density function; and an evaluation value determined using a machine learning model. Information notification device 200 then calculates a third evaluation value for each of the plurality of incidents by adding up the at least two second evaluation values. In addition, the priority is here determined to be higher with an increase in the third evaluation value.

FIG. 24 is a diagram for describing an eighth example of the priority determination method in Variation 4. In the eighth example, evaluation values corresponding to values of the expectation, the maximum value, and the variance determined in the first example to the third example are calculated. The evaluation values are an example of fifth evaluation values. The values of expectation, maximum value, and variance are classified into a plurality of ranks in accordance with magnitudes of the values, and evaluation values corresponding to the classified ranks are calculated as evaluation values corresponding to the values. For example, in FIG. 24, the values of expectation, maximum value, and variance are classified into three ranks: large, middle, and small in accordance with magnitudes of the values. For the incident information of No. 1, expectation E1 is classified as middle. Thus, an evaluation value of expectation E1 is calculated to be 2 points. Likewise, maximum value MAX1 is classified as large. Thus, an evaluation value of maximum value MAX1 is calculated to be 5 points. Likewise, variance V1 is classified as middle. Thus, an evaluation value of variance V1 is calculated to be 2 points.

Then, the evaluation value of expectation E1, the evaluation value of maximum value MAX1, and the evaluation value of variance V1 calculated for the incident information of type No. 1 are added up, and thus a score is calculated. Accordingly, a score of the incident information of No. 1 is calculated to be 9 points. FIG. 24 illustrates a method of calculating the score of the incident information of type No. 1 as an example, and scores of incident information of other types are calculated likewise. The scores are an example of the fourth evaluation values.

In the eighth example, an example of calculating evaluation values corresponding to an expectation, a maximum value, and a variance determined in the first example to the third example has been described. However, evaluation values may be calculated based on at least two values among: an expectation; a maximum value; a variance; a proportion of a distribution of index values greater than or equal to threshold value Th1 calculated based on the distributions in the fourth example to the sixth example; and an evaluation value determined using a machine learning model.

As seen from the above, when determining the priority, information notification device 200 calculates a fourth evaluation value for each of a plurality of incidents. A fourth evaluation value is calculated by (i) determining, for a corresponding incident, at least two fifth values according to at least two values among: an expectation based on a probability density function; a maximum value of a domain of a random variable in the probability density function; a variance in the probability density function; a proportion that is calculated based on the distribution and is accounted for by a distribution of index values greater than or equal to a first threshold value in the index; and an evaluation value determined using a machine learning model based on a plurality of incident trends corresponding to a plurality of first incident information items that are issued during the past third period, and (ii) adding up the at least two fifth evaluation values.

The priority determination methods in the first to eighth examples are described as an example of a case where the incident trend is given by a probability density distribution function as illustrated in FIG. 14. Likewise, the methods may be applied to a case where the incident trend is given by a range including a plurality of index values as illustrated in FIG. 15 or a case where the incident trend is given by a plurality of index values themselves as illustrated in FIG. 16.

For example, in a case where the priority determination method in the first example is applied to a distribution given by a range, a median of the entire range representing the distribution may be calculated as the expectation. Alternatively, in a case where the priority determination method in the first example is applied to a distribution given by a plurality of index values themselves, a mean of the plurality of index values may be calculated as the expectation. That is, in the first example, the priority is determined to be higher with an increase in an expectation based on a distribution of the plurality of index values that are likely to be determined in an index indicating the incident trend.

For example, in a case where the priority determination method in the second example is applied to a distribution given by a range, a maximum value of the range representing the distribution may be calculated as the maximum value. Alternatively, in a case where the priority determination method in the second example is applied to a distribution given by a plurality of index values themselves, a maximum value of the plurality of index values may be calculated as the maximum value. That is, in the second example, the priority is determined to be higher with an increase in a maximum value of the plurality of index values that are likely to be determined in an index indicating the incident trend.

For example, in a case where the priority determination method in the third example is applied to a distribution given by a range, a size (width) of the range representing the distribution may be calculated as the variance. That is, in the third example, the priority is determined to be higher with an increase in a variance based on a distribution of the plurality of index values that are likely to be determined in an index indicating the incident trend.

For example, in a case where the priority determination method in the fourth example is applied to a distribution given by a range, a proportion of a range where the incident trend is greater than or equal to threshold value Th1 to the entire range representing the distribution may be calculated instead of an occurrence probability that the incident trend in the probability density function is greater than or equal to threshold value Th1. Alternatively, in a case where the priority determination method in the fourth example is applied to a distribution given by a plurality of index values themselves, the number of index values greater than or equal to threshold value Th1 out of the plurality of index values may be calculated instead of an occurrence probability that the incident trend in the probability density function is greater than or equal to threshold value Th1. As seen from the above, the priority may be determined to be higher with an increase in a proportion that is calculated based on a distribution of the plurality of index values that are likely to be determined in an index indicating the incident trend and is accounted for by a distribution of index values greater than or equal to threshold value Th1 in the index.

Figure 25:
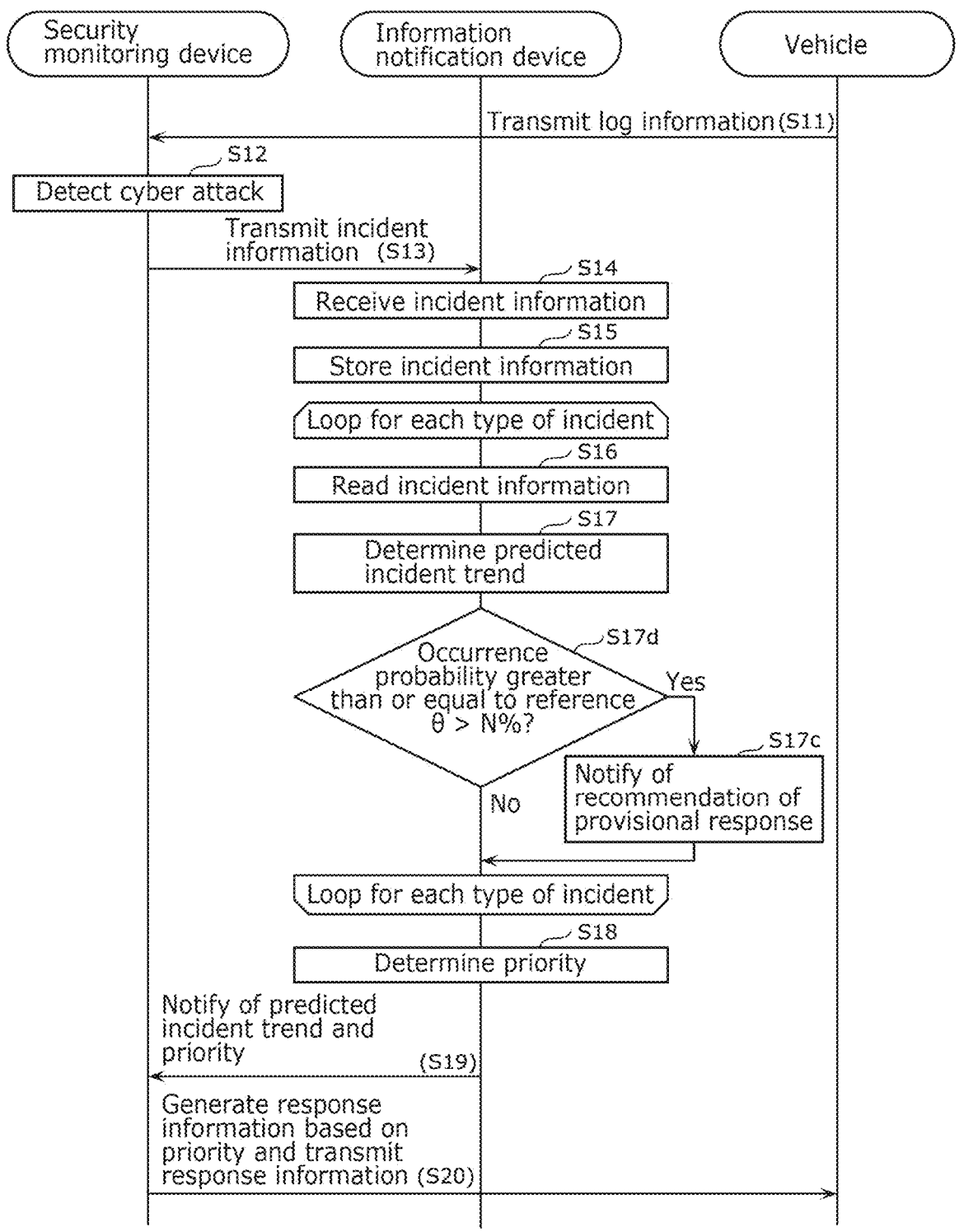
FIG. 25 is a sequence diagram illustrating an example of an information notification method executed by an information notification system according to Variation 4.

FIG. 25 is a sequence diagram illustrating an example of an information notification method executed by an information notification system according to Variation 4. Note that, in FIG. 25, the same processing as in the embodiment will be denoted the same reference sign as in FIG. 10, and the description thereof will be omitted.

After step S17, information notification device 200 determines whether an occurrence probability that the future occurrence count is greater than or equal to reference θ is greater than a reference value (N %) (S17d). N is a value greater than 0 and less than 100.

When an occurrence probability that the future occurrence count is greater than the reference value (N %) (Yes in S17d), information notification device 200 notifies security monitoring device 100 of recommendation to carry out the provisional response (S17c). Otherwise (No in S17d), information notification device 200 performs the next processing.

As seen from the above, the incident trend is determined for each type of incident, and based on the incident trend of the type of incident, information notification device 200 calculates a sixth evaluation value. The sixth evaluation value is, for example, an occurrence probability that the future occurrence count is greater than or equal to reference θ. The sixth evaluation value is not limited to the occurrence probability as described above. The sixth evaluation value may be a value that has a correlation with the above-mentioned priority in a case where the priority is determined based on the probability density function (e.g., the expectation, the maximum value, the variance, or the score (the second evaluation value, the third evaluation value, or the fifth evaluation value)). Then, information notification device 200 may notify of recommendation of the provisional response when the sixth evaluation value is greater than a reference value (N %) and may skip the notification of the recommendation of the provisional response when the sixth evaluation value is less than or equal to the reference value.

The priority may be indicated as not only a numerical value or a precedence but also a rank classified based on a numerical value. The priority may be indicated as a rank that is classified into a plurality of levels including, for example, a first rank corresponding to a first range, a second rank corresponding to a second range, and a third rank corresponding to a third range. The first rank is higher in priority than the second rank, and the second rank is higher in priority than the third rank. The first range is a range from a first value to a second value smaller than the first value, the second range is a range from a third value smaller than the second value to a fourth value smaller than the third value, and the third range is a range from a fifth value smaller than the fourth value to a sixth value smaller than the fifth value.

(5) Variation 5

Each of the elements in the embodiment described above may be configured in the form of an exclusive hardware product, or may be realized by executing a software program suitable for the element. Each of the elements may be realized by means of a program executing unit, such as a Central Processing Unit (CPU) or a processor, reading and executing the software program recorded on a recording medium such as a hard disk or semiconductor memory. Here, the software implementing information notification device 200 in the above-described embodiment is a program described below.

In other words, this program causes a computer to execute the information notification method including: obtaining the plurality of incident information items caused by cyber attacks on the monitoring target during the past first period; based on the plurality of incident information items obtained, determining, for each type of the plurality of incident information items, the incident trend of incident information items of the type in the monitoring target during the future second period and the priority of the provisional response or the permanent response to an incident information item of the type; and notifying of the incident trend and the priority that are determined for each type of the plurality of incident information items.

Herein above, although an information notification method according to one or more aspects of the present disclosure has been described based on the embodiment, the present disclosure is not limited to the above-described embodiment. Various modifications of the embodiment as well as other embodiments resulting from combinations of some of the constituent elements from the embodiment and variations that may be conceived by those skilled in the art may be included within the scope of the present disclosure as long as they do not depart from the essence of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-202232 filed on Dec. 19, 2022, Japanese Patent Application No. 2023-206062 filed on Dec. 6, 2023, and PCT International Application No. PCT/JP2023/044743 filed on Dec. 13, 2023.

INDUSTRIAL APPLICABILITY

The present disclosure is useful as an information notification method and the like capable of providing information for decision-making to make it accurate and easy to determine whether to carry out the provisional response and determination of a response priority of the permanent response.

The invention claimed is:

1. An information notification method comprising:
obtaining a plurality of incident information items on a plurality of incidents caused by cyber attacks on a monitoring target during a first period, wherein the first period is earlier than a current point in time, and wherein the monitoring target is a vehicle capable of movement;
determining, based on the plurality of incident information items obtained, for each type of the plurality of incidents: an incident trend of incidents of the type in the monitoring target during a second period; and a priority of a provisional response which is a response to stop a function involving a vulnerability or to stop a function or a permanent response which is a response to execute a software update to overcome the vulnerability to an incident of the type, wherein the second period is later than the current point in time;

presenting the incident trend and the priority that are determined for each type of the plurality of incidents and are used to perform an operation of the vehicle.

2. The information notification method according to claim 1, wherein
the priority being a higher priority indicates that the provisional response or the permanent response is made earlier, and based on the incident trend, the priority is determined to be higher with an increase in potential future damage caused by a cyber attack.

3. The information notification method according to claim 2, wherein
the incident trend relates to change over time in occurrence count of incidents for each type of the plurality of incidents.

4. The information notification method according to claim 3, wherein
the incident trend is a slope of the change over time at a first time point in the second period, and
the priority is determined to be higher with an increase in the slope.

5. The information notification method according to claim 3, wherein
the incident trend is a curve illustrating the change over time during the second period, and
the priority is determined to be higher with an increase in a maximum value of the curve.

6. The information notification method according to claim 3, wherein
the incident trend is a curve illustrating the change over time during the second period, and
the priority is determined to be higher with an increase in a time during which the curve is greater than a given occurrence count.

7. The information notification method according to claim 3, wherein
the incident trend is a total count of occurrence counts of incidents during the second period, and
the priority is determined to be higher with an increase in the total count.

8. The information notification method according to claim 3, wherein
the incident trend is a total count of occurrence counts of incidents during the second period, and
the priority is determined to be higher with an increase in a total amount of damage that is calculated by multiplying the total count by an amount of damage that occurs when one incident occurs.

9. The information notification method according to claim 1, wherein
the incident trend includes a distribution of a plurality of index values that are likely to be determined in an index indicating the incident trend in the determining.

10. The information notification method according to claim 9, wherein
the distribution is given by a probability density function with a random variable that is the index indicating the incident trend.

11. The information notification method according to claim 9, wherein
the distribution is given by a first range that includes the plurality of index values.

12. The information notification method according to claim 9, wherein
the priority is determined to be higher with an increase in an expectation based on the distribution.

13. The information notification method according to claim 9, wherein
the priority is determined to be higher with an increase in a maximum value of the plurality of index values.

14. The information notification method according to claim 9, wherein
the priority is determined to be higher with an increase in a variance in the distribution.

15. The information notification method according to claim 9, wherein
the priority is determined to be higher with an increase in a proportion that is calculated based on the distribution and is accounted for by a distribution of index values greater than or equal to a first threshold value in the index.

16. The information notification method according to claim 9, wherein
the priority is determined using a machine learning model generated by machine learning using, as an input, a plurality of incident trends corresponding to a plurality of first incident information items that are issued during a third period and using, as ground truth data, a first evaluation value determined for each of the plurality of incident trends, wherein the third period is earlier than the current point in time.

17. The information notification method according to claim 9, wherein
a precedence based on the priority is determined using a machine learning model generated by machine learning using, as an input, a plurality of incident trends corresponding to a plurality of first incident information items that are issued during a third period and using, as ground truth data, a precedence determined for each of the plurality of incident trends, wherein the third period is earlier than the current point in time.

18. The information notification method according to claim 9, wherein
the determining further includes:
calculating at least two second evaluation values for each of the plurality of incidents by ranking the plurality of incidents according to each of at least two values among: an expectation based on the distribution; a maximum value of the plurality of index values; a variance in the distribution; a proportion that is calculated based on the distribution and is accounted for by a distribution of index values greater than or equal to a first threshold value in the index; and an evaluation value determined using a machine learning model based on a plurality of incident trends corresponding to a plurality of first incident information items that are issued during a third period, wherein the third period is earlier than the current point in time; and
calculating a third evaluation value for each of the plurality of incidents by adding up the at least two second evaluation values, and
the priority is determined to be higher with an increase in the third evaluation value.

19. The information notification method according to claim 9, wherein
the determining further includes calculating a fourth evaluation value for each of the plurality of incidents, in the calculating of the fourth evaluation value, for each of the plurality of incidents, at least two fifth evaluation values are determined according to at least two values among: an expectation based on the distribution; a maximum value of the plurality of index values; a variance in the distribution; a proportion that is calculated based on the distribution and is accounted for by a distribution of index values greater than or equal to a first threshold value in the index; and an evaluation value determined using a machine learning model based on a plurality of incident trends corresponding to a plurality of first incident information items that are issued during a third period, wherein the third period is earlier than the current point in time, and the fourth evaluation value is calculated by adding up the at least two fifth evaluation values, and the priority is determined to be higher with an increase in the fourth evaluation value.

20. The information notification method according to claim 1, wherein the determining includes determining, for each type of the plurality of incidents and for each model of monitoring targets: an incident trend of incidents of the type and the model during the second period, the monitoring targets each being the monitoring target; and a priority of a provisional response or a permanent response to an incident of the type and the model.

21. The information notification method according to claim 1, wherein the determining further includes calculating, for each type of the plurality of incidents, a total amount of damage by multiplying a total occurrence count of incident information items of the type by an amount of damage that occurs when an incident information item of the type is issued, and the priority is determined to be higher with an increase in the total amount of damage.

22. The information notification method according to claim 1, further comprising:

calculating, for each type of the plurality of incidents, an index value about an occurrence count of incidents of the type during the second period, based on the incident trend determined for each type of the plurality of incidents; and notifying of recommendation of the provisional response when the index value is greater than a reference value.

23. The information notification method according to claim 10, further comprising:

calculating a sixth evaluation value for each type of the plurality of incidents based on the incident trend determined for each type of the plurality of incidents; and notifying of recommendation of the provisional response when the sixth evaluation value is greater than a reference value.

24. The information notification method according to claim 1, wherein the incident trend is determined using a machine learning model generated by machine learning using, as an input, a plurality of first incident information items that are issued during a third period and using, as ground truth data, a track record of an incident trend based on a plurality of second incident information items that are issued during a fourth period, wherein each of the third period and the fourth period is earlier than the current point in time, and the fourth period being later than the third period.

25. The information notification method according to claim 1, further comprising:

determining a total amount of damage caused by a cyber attack during the second period by using a machine learning model generated by machine learning using, as an input, a plurality of first incident information items that are issued during a third period and using, as ground truth data, a total amount of damage based on a plurality of second incident information items that are issued during a fourth period, wherein each of the third period and the fourth period is earlier than the current point in time, and the fourth period being later than the third period.

26. The information notification method according to claim 1, wherein the incident trend is determined using a correlation between a plurality of first incident information items issued during a third period and a track record of an incident trend based on a plurality of second incident information items issued during a fourth period, wherein each of the third period and the fourth period is earlier than the current point in time, and the fourth period being later than the third period.

27. The information notification method according to claim 1, further comprising:

determining a total amount of damage caused by a cyber attack during the second period by using a correlation between a plurality of first incident information items issued during a third period and a track record of a total amount of damage based on a plurality of second incident information items issued during a fourth period, wherein each of the third period and the fourth period is earlier than the current point in time, and the fourth period being later than the third period.

28. An information notification device comprising:

a processor; and memory connected to the processor, wherein by using the memory, the processor operates as:

an obtainer that obtains a plurality of incident information items on a plurality of incidents caused by cyber attacks on a monitoring target during a first period, wherein the first period is earlier than a current point in time, and wherein the monitoring target is a vehicle capable of movement;

a determiner that determines, based on the plurality of incident information items obtained, for each type of the plurality of incidents: an incident trend of incidents of the type in the monitoring target during a second period; and a priority of a provisional response, which is a response to stop a function involving a vulnerability or to stop a function, or a permanent response, which is a response to execute a software update to overcome the vulnerability to an incident of the type, wherein the second period is later than the current point in time; and a presenter that presents the incident trend and the priority that are determined for each type of the plurality of incidents and are used to perform an operation of the vehicle.

* * * * *